(12) United States Patent
Ishiyama

(10) Patent No.: US 7,593,019 B2
(45) Date of Patent: Sep. 22, 2009

(54) METHOD AND APPARATUS FOR COLLATING OBJECT

(75) Inventor: Rui Ishiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/944,983

(22) Filed: Nov. 26, 2007

(65) Prior Publication Data

US 2008/0094393 A1 Apr. 24, 2008

Related U.S. Application Data

(62) Division of application No. 10/014,075, filed on Nov. 13, 2001, now Pat. No. 7,321,370.

(30) Foreign Application Priority Data

Nov. 20, 2000 (JP) .............................. 2000-353402

(51) Int. Cl.
*G09G 5/00* (2006.01)
*G06T 11/40* (2006.01)
*G06T 15/10* (2006.01)
*G06T 17/30* (2006.01)

(52) U.S. Cl. ....................... 345/582; 345/552; 345/423; 345/427; 345/607

(58) Field of Classification Search ................. 345/582, 345/423, 419, 427, 607, 552; 382/118, 218, 382/219

See application file for complete search history.

(56) References Cited

U.S. PATENT DOCUMENTS 5,283,644 A 2/1994 Maeno (Continued)

FOREIGN PATENT DOCUMENTS

EP 1 039 417 A1 9/2000

(Continued)

OTHER PUBLICATIONS

Ishiyama et al., "An Appearance Model Constructed on 3-D Surface for Robust Face Recognition Against Pose and Illumination Variations", IEEE Transactions on Systems, Man, and Cybernetics: Part C: Applications and Reivews (2005), vol. 35, No. 3, pp. 326-334.

(Continued)

*Primary Examiner*—Hau H Nguyen
(74) *Attorney, Agent, or Firm*—Scully, Scott, Murphy & Presser, P.C.

(57) ABSTRACT

An object collation method comprising a registration procedure for registering the registered data of a registered object in a database, and a collation procedure for collating the input image of a target object with the registered data. The registration procedure includes a step of storing the three-dimensional shape of the registered object and a texture space defined by a texture group indicating the luminance and/or color information of each position of the object surface under various illumination conditions. The collation procedure includes the steps of: generating an illumination fluctuation space defined by the image group under the various illumination conditions, at the location and position of the target object in the input image from the three-dimensional shape and the texture space; and collating the target object and the registered object based on the distance between the illumination fluctuation space and the input image.

4 Claims, 27 Drawing Sheets

U.S. PATENT DOCUMENTS

| | | | |
|---|---|---|---|
| 5,293,469 | A | 3/1994 | Outa et al. |
| 5,706,419 | A * | 1/1998 | Matsugu et al. ............. 345/420 |
| 5,724,447 | A | 3/1998 | Fukushima |
| 5,786,822 | A | 7/1998 | Sakaibara et al. |
| 5,819,016 | A | 10/1998 | Watanabe et al. |
| 5,901,244 | A | 5/1999 | Souma et al. |
| 6,081,607 | A | 6/2000 | Mori et al. |
| 6,141,435 | A | 10/2000 | Naoi et al. |
| 6,204,857 | B1 | 3/2001 | Piazza et al. |
| 6,418,235 | B1 | 7/2002 | Morimoto et al. |
| 6,473,083 | B1 | 10/2002 | Suzuki et al. |
| 6,483,521 | B1 | 11/2002 | Takahashi et al. |
| 2001/0031073 | A1 | 10/2001 | Tajima |

FOREIGN PATENT DOCUMENTS

| | | |
|---|---|---|
| JP | 02-311962 | 12/1990 |
| JP | 4-130587 | 5/1992 |
| JP | 4-256185 | 9/1992 |
| JP | 05-108804 | 4/1993 |
| JP | 6-109441 | 4/1994 |
| JP | 06-168317 | 6/1994 |
| JP | 09-259271 | 10/1997 |
| JP | 10-021394 | 1/1998 |
| JP | 2872776 | 1/1999 |

OTHER PUBLICATIONS

Akio Matsui et al., "Actual illumination and imaginary illumination combined on the basis of multiple light source image KL development and environmental observations", technical research report of the *Institute of Electronic, Information and Communication Engineers,* Oct. 16, 1997, vol. 97, No. 324, pp. 29-36.

Satoshi Imaoka et al., "Method of illuminating facial images without relying on facing the face", technical research report of the *Institute of Electronic, Information and Communication Engineers,* Jun. 17, 1999, vol. 99, No. 118, pp. 51-58.

Paul J. Besl, et al "Three-Dimensional Object Recognition", Computing Surveys, vol. 17, No. 1, Mar. 1985.

Peter W. Hallinan, et al. "A Low-Dimensional Representation of Human Faces For Arbitrary Lighting Conditions", Institute Of Electrical And Electronic Engineers, Proceedings of the Computer Vision and Pattern Recognition, Seattle, Jun. 21-23, 1994, Los Alanitos, IEEE Comp. Soc. Press, U.S., Jun. 21, 1994, pp. 995-999, XP00515974.

Peter N. Belhumeur, et al., "What is the Set of Images of an Object Under All Possible Illumination Conditions", International Journal of Computer Vision, vol. 29, No. 3, 1998, pp. 245-260.

Athinodoros S. Georghiades et al., "Illumination Cones for Recognition Under Variable Lighting: Faces", Computer Vision and Pattern Recognition, 1998, Proceedings. 1998 IEEE Computer Society Conference on Santa Barbara, CA, USA Jun. 23-25, 1998, Los Alamitos, CA USA IEEE Comput. Soc, US, Jun. 23, 1998, pp. 52-58, XP010291667.

Shree K. Nayar, et al. "Dimensionality of Illumination in Appearance Matching", Robotics and Automation, 1996. Proceeding, 1996 IEEE International Conference on Minneapolis, MN, USA Apr. 22-28, 1996, New York, NY USA, IEEE, US, vol. 2, Apr. 22, 1996, pp. 1326-1332, XP010162928.

Anonymous: "Covariance matrix" Internet Article, (Online) Jul. 25, 2006, XP002393450, Retrieved from the Internet: URL:http://en.wikipedia.org/wiki/Convariance_matrix>(retrieved on Aug. 3, 2006).

* cited by examiner

METHOD AND APPARATUS FOR COLLATING OBJECT

CROSS REFERENCE TO RELATED APPLICATION

The present application is a divisional of U.S. patent application Ser. No. 10/014,075 filed on Nov. 13, 2001, which has issued as U.S. Pat. No. 7,321,370, which claims priority from Japanese Patent Application No. 2000-353402 filed Nov. 20, 2000, the entire contents and disclosure of which is incorporated herein by reference.

BACKGROUND OF THE INVENTION

1. Field of the Invention

The present invention relates to an object collation method and an object collation apparatus for collating an object with an image. More specifically, the invention relates to an object collation method and an object collation apparatus which is made robust against fluctuations in the photographic conditions such as the location and position on an image and the illumination conditions of an object to be collated, by registering the information such as the three-dimensional shape of the object and the reflectivity and the color information of the object surface in advance.

2. Description of the Related Art

The object collation technique or object recognition technique is one for finding out what a first object suitably arranged in a three-dimensional space is, and collates the object with a second object which is registered in advance by making use of the input image (or its group) which has been obtained by imaging the first object with a photography device such as a camera as shown in FIG. 1. In the following, the object to be registered in advance will be called the "registered object", and the object to be collated with the registered object will be called the "target object". The apparatus for the object collation will be called the "collating apparatus" in FIG. 1.

The object collation process is coarsely constructed of two procedures: a registration procedure for registering the registered object in advance; and a collation procedure for comparing/collating the target object with the registered object, to determine what is taken in the input image (or its group) of the target object. In these individual procedures, the taken image is used as a two-dimensional image having a two-dimensional extension or is converted into and used as a three-dimensional shape by a three-dimensional shape measuring apparatus.

Here will be described the object collation technique of the prior art with reference to References below.

Prior Art 1:

The object collation technique using a two-dimensional image as an input by registering in advance the image is exemplified in Reference 1, Japanese Patent No. 2872776. This technique supposes a human face as the object to be collated, and uses an apparatus having the construction shown in FIG. 2. In the registration phase, a two-dimensional image, as taken by camera 11, is stored in storage unit 12. In the collation phase, camera 13 takes a two-dimensional face image as the input images. Normalization unit 14 extracts the face feature points for standards of the position and the size such as the locations of eyes and nose from the input images by the image processing technique, and outputs the normalized image which is normalized in the two-dimensional position and size on the image with reference to the coordinate positions of the feature points. Finally, image comparison unit 15 compares the registered image read out from storage unit 12 and the normalized image by the pattern recognition technique, and outputs the collation result.

However, this mere two-dimensional image collating technique cannot cope with the three-dimensionally rotational fluctuations of an object to be collated or the apparent fluctuations on the two-dimensional image due to the fluctuations in the luminance conditions at the time of taking the image, so that it is seriously limited in its application range.

Prior Art 2:

The object collation technique of the prior art using a three-dimensional shape is exemplified by Reference 2, Japanese Patent Laid-Open Application No. 9-259271 (JP, 09259271, A). This technique employs an apparatus having the construction shown in FIG. 3. In the registration phase, the three-dimensional shape and the color information of a registered object are measured as face data by three-dimensional shape color information measuring unit 21 and are stored in storage unit 22. In the collation phase, too, the three-dimensional shape and the color information of a target object are measured as input data by three-dimensional shape color information measuring unit 23. Translation/rotation unit 24 generates a rotational face data group by translating the input data and adding a little rotation to it so that the center of gravity may coincide to the face data. Minimum error calculation unit 25 determines the minimum of the error between the face data and the rotational face data group to correct the three-dimensional location and position, and executes the collation on the basis of the minimum error.

However, this collation technique needs the three-dimensional shape not only at the registration phase but also at the collation phase. Therefore, the collation apparatus requires the three-dimensional shape measuring apparatus, so that it has a problem in its high cost. This problem is especially serious where the input image is to be taken and collated at a place different from that of the registration or at a plurality of places. There are left other problems that an object to be collated has to stand still till the measurement ends, and that highly precise shape data cannot be obtained unless the object is placed in the dark chamber or under the gloomy circumstances. These problems also limit the application range.

Prior Art 3:

In Reference 3, Japanese Patent Laid-Open Application No. 06-168317 (JP, 06168317, A), there is disclosed a collation technique for taking a two-dimensional image in each of the registration phase and the collation phase. This technique employs an apparatus having the construction shown in FIG. 4. In the registration phase, a camera 31 takes a two-dimensional image of a registered object, and a feature extraction unit 32 detects a pixel location of large luminance fluctuations and outputs the feature point location. This feature point location is stored in a storage unit 33. In the collation phase, a camera 34 takes a two-dimensional image of a target object as an input image, and a feature extraction unit 35 detects a pixel location of large luminance fluctuations and outputs the feature point location. A collation execution unit 37 compares and collates the registered feature point location and the feature point location of the input image. In order to absorb the fluctuations in the location and position of the target object, a three-dimensional shape model of a standard object is prepared in a location/position normalization unit 36 so that it is utilized to normalize the location and position.

Thus, the method for detecting the pixel position of large luminance fluctuations is effective for building blocks of extremely large radius of three-dimensional curvature or for such a black marker on a white board as has extremely large reflectivity fluctuations. However, it is known that this method is not suitable for the human face, as referred to in Reference 3, and this method finds it generally difficult to detect the coordinate location stably. On the other hand, the position is corrected with the standard three-dimensional shape of an object group to be collated, but the method has a problem that it cannot be applied to the case in which the similarity of the shape is not high between the individual objects of the group.

Prior Art 4:

In order to correct not only the fluctuations in the location and position but also the fluctuations according to the illumination conditions, there is a technique using only ordinary two-dimensional images in both the registration procedure and the collation procedure, as disclosed in Reference 4, Hiroshi Murase and Shree K. Nayer, "Visual Learning and Recognition of 3-D Objects from Appearance", Int. J. Computer Vision, vol. 14, pp. 5-24, 1995. This technique employs an object collation apparatus having the construction shown in FIG. 5. In the registration phase, a photography unit 41 takes a two-dimensional image group covering all the positions and the illumination conditions that can be thought in the input image of the target object on the registered object. A manifold calculation unit 42 determines a basic vector group capable of expressing the change in the two-dimensional image group, by a principal component analysis, to generate a feature space featuring the correlation with the basic vector group, and determines the locus of the two-dimensional image group in the feature space, as the manifold. This locus is stored in a storage unit 43. In the collation phase, a camera 44 takes the two-dimensional image of the target object as an input image. A distance calculation unit 45 calculates the distance in the feature space between the input image and the manifold so that the collation is executed by using the calculated distance as a measure. Thus, it is possible to collate the input image which has been taken in the various locations and positions and under the various illumination conditions.

Considering the various illumination conditions such as a plurality of light sources or widening light sources as the illumination conditions of the input image of the target object, however, this technique needs a large number of sample images of the registered object covering those conditions. On the other hand, no assumption is made on the shape of the manifold in the feature space so that parameters for the photographic conditions have to be sought for determining the distance from the input image. Therefore, there arises a problem that a large number of calculations are required.

Prior Art 5:

The change in the two-dimensional image under the illumination conditions of the case in which the location and position of an object are fixed has been specifically analyzed in Reference 5, Peter N. Belhumeur and David J. Kriegman, "What Is the Set of Images of an Object under All Possible Illumination Conditions?", Int. J. Computer Vision, vol. 28, pp. 245-260, 1998. If the location and position of the object are fixed, the image under arbitrary illumination conditions can be decomposed and expressed in the sum of images each under one point light source. Therefore, the images under an arbitrary number of light sources can be expressed with coefficients of intensities of every light sources as a linear sum of images under every light sources.

On the basis of this analysis, Reference 5 has proposed a method, as called the "Illumination Subspace Methods" (as will be referred to as "Method 1"). In this method, there is utilized an object collation apparatus having the construction shown in FIG. 6. In the registration phase, a photography unit 51 is set with three or more different illumination conditions for pixels shadowed as little as possible, to take the two-dimensional image group of a registered object. A normal calculation unit 52 determines a vector group corresponding to products of the reflectivities of the object surfaces, as corresponding to the individual pixels of the image, and the normal vectors by the principal component analysis from the two-dimensional image group. Subsequently, an image generation unit 53 generates an image group called the "extreme ray" or the images of the case, in which the illumination is in the direction expressed by the exterior product of arbitrary two vectors of the vector group. This image group is stored in a storage unit 54. In the collation phase, a camera 55 takes a two-dimensional image of the target object as an input image. Where the reflecting characteristics of the object surface are completely scattering and have a convex shape, the image under an arbitrary illumination condition can be expressed as a linear sum having a positive coefficient of the extreme ray group so that the coefficient group can be calculated by the least square method under the nonnegative conditions. An illumination correction unit 56 performs the least square calculations to generate the comparison image of the target object under the same illumination conditions as those for the input image by the linear sum of the extreme ray group using the determined coefficient group. An image comparison unit 57 collates the comparison image and the input image by calculating their similarities.

According to this method, seriously many calculations are required for the procedure to calculate the extreme rays according to the complexness of the shape. According to Reference 5, the number of extreme rays is m(m−1) at the maximum where an m-number of linear independent normal vectors are on the object surface. Unless the object shape is as simple as that of the building blocks, therefore, a large number of images have to be calculated to raise a problem in the number of calculations to be made on all the extreme rays for the general object of a complicated shape. On the other hand, the method cannot be applied as it is to the case in which the object shape is not convex to have shadows caused by other portions shading the light source. Where the location or position of the object changes, moreover, there arises another problem that it is necessary to take the image of the object conforming to the location or the position and to calculate all the extreme rays over again.

Prior Art 6:

In Reference 6, A. S. Georghiades, "Illumination Cones for Recognition Under variable Lighting: Faces", Proc. IEEE Int. Conf. CVPR, pp. 52-58, 1998, there is disclosed a method (as will be referred to as "Method 2"). When the extreme rays are calculated in Method 1, according to Method 2, the technique of the computer graphics (CG) such as ray tracing is used to calculate what pixel is to be shadowed from the three-dimensional shape of the object for shadowing. As a result, Method 1 can also be applied even to an object having a non-convex shape.

According to this Method 2, however, where the location or position of the object changes, the image of this object has to be taken again conforming to the location or position thereby to calculate all the extreme rays again. Especially in this method, the calculations of the extreme rays include the shading of the images of the object, but this shadowing treatment requires many calculations such as the ray tracings thereby to raise a problem that the collations take a long time.

Prior Art 7:

Reference 6 has also proposed an exemplification of the Sampling Method (as will be referred to "Method 3") by a method using an object collation apparatus having the construction shown in FIG. 7. It is troublesome to calculate all the extreme rays, as in Method 1. In the registration phase, therefore, a photography unit 61 takes a two-dimensional image group by setting such a suitable number of illumination directions that angles θ and φ of FIG. 8 may cover the entirety at as an equal spacing as possible, and the two-dimensional image group is substituted for the extreme rays. From now on, the nonnegative least square method is applied as in Method 1 to correct the illuminations thereby to recognize the object. FIG. 8 illustrates the angles indicating the directions of the illuminations for determining the illumination conditions with respect to the object.

For this method, however, it is necessary to take images by illuminating the object to be collated in many directions and to have a special illumination device at the registration phase. Where the location or position of the object to be collated changes, the images under the numerous illumination conditions of the objects conforming to the location or position have to be taken again. Therefore, it is necessary to take the images at all the locations and positions, as supposed for the input images. As a result, there arise problems that the registration is troublesome and that the image taken at the unregistered location or position cannot be collated.

The object to be collated is generally followed by the three-dimensional translations and rotations in front of the imaging device such as a camera so long as it is not especially fixed or adjusted. As apparent from the momentary fluctuations of the illumination conditions in the outdoor, seriously large fluctuations are apparent on the two-dimensional image inputted as the collation object. In the object collation technique of the prior art thus far described, those fluctuations in the location and position and in the illumination conditions cannot be sufficiently corrected to raise a problem that the application range is seriously restricted.

In order to solve those problems, the Assignee of the present invention has proposed the following technique in Japanese Patent Application No. 2000-105399 (JP, 2000-105399), "Image Collation Apparatus, Image Collation Method, and Recording Medium Recorded with Programs Therefor" (Reference 7). In this technique, a highly precise collation can be made even where both the location and position and the illumination conditions change, by registering the three-dimensional shape of a registered object in advance, by generating an illumination fluctuating texture group corresponding to the location and position of the input image of the target object by the computer graphics even if the location and position change, and by determining an image space enveloping the image group thereby to process the illumination corrections. Even if the location and position of the target object in the input image change, according to this technique, the images can be formed at the location and position adjusted by the three-dimensional shape of the registered object. This makes it unnecessary to take the image group at all the necessary locations and positions in the registration phase. At the step of generating the images under the numerous illumination conditions having the location and position adjusted to the input image, however, the numerous calculations including the shadowing treatment are required to leave unsolved a problem that the collations take a long time.

SUMMARY OF THE INVENTION

An object of the present invention is to provide an object collation method capable of collating a target object by a two-dimensional image taken by an ordinary camera, without needing a three-dimensional shape as input data to be used for the collation.

Another object of the present invention is to provide an object collation method which can correct the change in the three-dimensional location and position of a target object in an input image, can measure the necessary data of a registered object conveniently in a registration phase, and can realize the correction of illumination conditions by a fast processing for the input image taken under the various illumination conditions.

Still another object of the present invention is to provide an object collation apparatus capable of collating a target object by a two-dimensional image taken by an ordinary camera, without needing a three-dimensional shape as input data to be used for the collation.

A further object of the present invention is to provide an object collation apparatus which can correct the change in the three-dimensional location and position of a target object in an input image, can measure the necessary data of a registered object conveniently in a registration phase, and can realize the correction of illumination conditions by a fast processing for the input image taken under the various illumination conditions.

According to a first aspect of the invention, there is provided an object collation method comprising: a registration procedure for registering a registered data of a registered object in a database; and a collation procedure for collating an input image of an target object with the registered data; wherein the registration procedure comprises the steps of: storing a three-dimensional shape of the registered object; and storing a texture space, which is an image space, defined by a texture group indicating luminance and/or color information of each position of a surface of the registered object under various illumination conditions; and wherein the collation procedure comprises the steps of: taking a two-dimensional image of the target object as an input image; generating an illumination fluctuation space or the image space, which is defined by the image group under the various illumination conditions, at the location and position of the target object in the input image from the three-dimensional shape and the texture space; and collating the target object and the registered object on the basis of the distance between the illumination fluctuation space and the input image.

The collation step is exemplified by the step of confirming whether or not the target object is the registered object, the step of retrieving what of the registered objects the target object is, or the step of retrieving the object resembling the target object from the registered objects.

According to a second aspect of the invention, there is provided an object collation apparatus comprising: registration means for storing the three-dimensional shape of the registered object and a texture space which is an image space defined by a texture group indicating the luminance and color information of each location of the object surface under various illumination conditions; and collation means for: taking the two-dimensional image of the target object as an input image; generating an illumination fluctuation space of the image space, which is defined by the image group under the various illumination conditions, at the location and position of the target object in the input image from the three-dimensional shape and the texture space; and collating the target object and the registered object on the basis of the distance between the illumination fluctuation space and the input image.

The collation means preferably executed at least one of confirming whether or not the target object is the registered object, retrieving what of the registered objects the target object is, and retrieving the object resembling the target object from the registered objects.

According to the present invention, only the registration unit may measure the three-dimensional shape of the registered object and the reflectivities of the object surface, or the image under the suitable illumination conditions. The collation unit may include a photography unit having a photography device such as a video camera for taking the ordinary two-dimensional image. A practical apparatus can be constructed without requiring the three-dimensional shape measuring device at the collation stage. Since the three-dimensional shape of the registered object is registered, a complete correction can be made against the fluctuations of the three-dimensional location and position of the target object in the input image. A sufficient correction can also be made against the fluctuations of the illumination conditions. Moreover, the illumination corrections of the invention can make the collation judgment at a higher speed than those of Methods 1 and 3 of the prior art without requiring the regeneration of the illumination fluctuation texture group even with changes in the location and position, because the illumination fluctuation texture space having been calculated in advance at the registration procedure is converted in conformity to the location and position of the target object in the input image thereby to generate the illumination fluctuation space.

The above and other objects, features, and advantages of the present invention will become apparent from the following description based on the accompanying drawings which illustrate examples of preferred embodiments of the present invention.

DESCRIPTION OF THE PREFERRED EMBODIMENTS

First Embodiment

In an object collation method to be described herein, a registration procedure for registering the data of a registered object in a database includes the steps of: storing the three-dimensional shape of the registered object; and storing a texture space which is an image space defined by a texture group indicating the luminance and/or color information of each position of the object surface under various illumination conditions. A collation procedure for collating the input image of an target object with the registered data includes the step of: taking the two-dimensional image of the target object as an input image; generating an illumination fluctuation space which is an image space defined by the image group under the various illumination conditions, at the location and position of the target object in the input image from the three-dimensional and the texture space; and collating the target object on the basis of the distance between the illumination fluctuation space and the input image. The collating step is, for example, the step of confirming whether or not the object is to be collated, the step of retrieving what the registered object is, or the step of retrieving the similar one of the registered objects.

In this object collation method utilizes the following possibility of the quick object collation. Specifically, the texture indicating the luminance or color of each position of the object surface to be collated changes with the illumination conditions. By registering the space (or the texture space) defined by the various texture groups generated by those illumination fluctuations and the three-dimensional shape of the registered object, however, the texture space can be converted into the illumination fluctuation space which is generated by the fluctuations of the illumination conditions when the target object exists in the location and position needed. As a result, the image can be generated under the various illumination conditions of the target object in the location and position.

Moreover, the illumination fluctuation space at the target location and position of the target object can be generated exclusively by a simple coordinate transformation of the texture space of the registered object, so that the calculations in the collation procedure can be drastically reduced to execute the quick object collation.

At first, here will be described the registration procedure.

At the registered object measurement step, there are measured the three-dimensional shape of the registered object and the reflectivity of the object surface. For these, it is possible to use the various measurement apparatus and methods. For example, it is possible to use a three-dimensional shape measurement apparatus, as disclosed in Reference 8, Japanese Patent Laid-Open Application No. 2001-12925 (JP, 2001-012925, A). In addition, it is possible to utilize the various apparatus or means such as the three-dimensional shape measuring apparatus.

Figure 9:
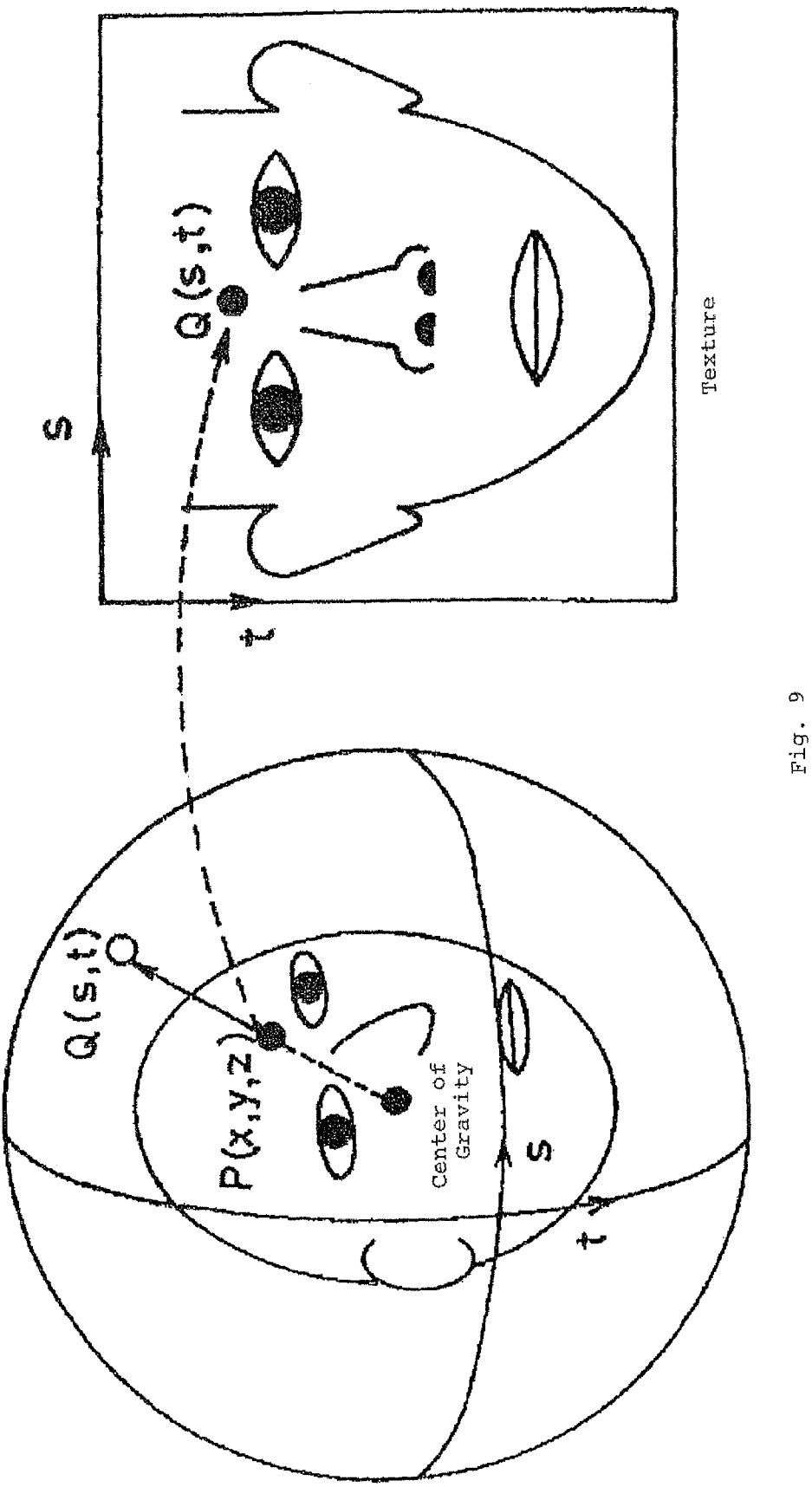
FIG. 9 is a diagram for explaining one example of a method for defining a texture coordinate system with respect to an object surface.

Next, at the texture group generation step, there is set on the object surface a coordinate system of the texture space, that is, a texture coordinate system. The texture space is used to express the color or luminance information of each point of the object surface as an image, and the expressed image is treated as a texture. As the method for setting the texture coordinate system, there can be utilized various methods, as exemplified by supposing a sphere covering the object around the center of gravity of the object, as shown in FIG. 9, by projecting each point P on the object surface on the sphere surface around the center of gravity, and by adopting the longitude and latitude (s, t) of the projected point Q as the texture coordinates. Various apparatus and means can be additionally utilized By using the technique of the computer graphics (CG), the changes in the gradations of each location on the object surface and in the luminance or color due to the shadow are calculated to generate a texture group under the various illumination conditions. The changes in the luminance or color due to the changes in the gradations of each pixel of the texture can be calculated from the reflectivity of the object surface corresponding to that pixel, the normal direction calculated from the three-dimensional shape, and the direction of illuminations. On the shadow generation, the ray tracing can be executed by using that three-dimensional shape to decide whether or not the optical ray is irradiated under the illumination conditions set for the pixel.

The texture group can be generated by setting the various illumination conditions and by generating the aforementioned texture space.

Next, at the texture space generation step, the texture space is generated as the space which is defined by the texture group.

It is assumed that the object surface has reflective characteristics of a completely scattering face, that the object shape is convex to have no shadow formed by shading the light source by the remaining portions, and that the light source is located at the infinite distance, the luminance value I(s, t) of each pixel (s, t) of the texture can be modeled by equation (1) with a reflectivity B(s, t) of the object surface corresponding to the pixel, the normal direction $\vec{N}(s,t)$, and the intensity $l_i$ and the direction $\vec{L}_i$ of each illumination:

$$I(s, t) = B(s, t) \max\left(\sum_i (l_i \vec{L}_i \cdot \vec{N}(s, t)), 0\right). \qquad (1)$$

If the effect of max( ) is ignored, an arbitrary illumination condition including the case of a plurality of illuminations can be expressed by one illumination vector $\vec{L}$, as expressed by equation (2):

$$I(s, t) = B(s, t) \vec{N}(s, t) \cdot \vec{L} \qquad (2)$$
$$\left(\vec{L} = \sum_i l_i \vec{L}_i\right).$$

Therefore, the degree of freedom of the texture of the object, as generated by the illumination fluctuations, is the dimensions of the illumination vector $\vec{L}$, i.e., three dimensions at most. As a matter of fact, the degree of freedom is dimensionally higher because of the effect of max( ), because the light source is shaded to have a shadow by the remaining portions of the object and because the reflective characteristics are not the completely scattering face. Since the most portion can be expressed by a three-dimensional partial space, however, the actual texture fluctuations can also be sufficiently approximated as the partial space of lower dimensions. This partial space of lower dimensions will be called the "texture space" of an object.

In order to obtain the basic vector of the texture space, there is used the principal component analysis. A number of textures of the object under the various illumination conditions are prepared to approximate the entire set of texture groups which are changed with the fluctuations of the illumination conditions. Each texture is one under a single point light source at an infinite distance, and there are prepared the numerous textures in which the directions of light sources are so set at a suitable interval as to include all the conceivable directions as the illumination conditions at the time of taking the input image. The texture under a plurality of illuminations is defined by the sum of the textures of the single illumination so that only the texture under the single illumination is sufficient. For generating the texture group, there are used the registered three-dimensional shape and the reflectivity of the surface. This generation method is exemplified by a method utilizing the fundamental functions of the computer graphics. The functions of the computer graphics have been detailed in Reference 9, Mason Woo, Jackie Neider and Tom Davis, "Open GL Programming Guide", Addison Weslay Publishers, Japan. Most of the functions standardized in the computer are to generate only gradations by characterizing the reflection of the object surface by the completely scattering model. In the present invention, however, not only the gradations but also the ray tracing technique is used to regenerate the shadow so that an image as real as possible can be generated.

As has been described hereinbefore, the utilization of the functions of the computer graphics for generating the image is just one example. The texture could naturally be generated by calculating the luminance values numerically on the pixels necessary for collations.

In the following, the texture is expressed by the vector in which the luminance values of the pixels in such a region of the texture entirety as is used for the collation are longitudinally arranged. When the texture group has an N-number of textures, V is expressed by equation (3) if the individual textures are expressed by vectors $\vec{K}_i$ (i=1,2, ..., N):

$$S = [\vec{K}_1 \ \vec{K}_2 \ ... \ \vec{K}_N], \quad (3)$$

$$V = \frac{1}{N}SS^T.$$

Next, the eigenvalues $\sigma_i$ of V and the eigenvectors $\vec{B}_i$ are determined in the sequence of the larger eigenvalues to M. Then, the texture space of an object j is approximated by an M-dimensional linear space $\Psi_j$ having the base of a vector { $\vec{B}_i$ }. Here, the dimension M of the texture space can be determined in the balance with the precision required for correcting the illumination. Where an M-number of eigenvectors are used, the cumulative contribution ratio of the eigenvalues can be calculated by equation (4):

$$\frac{\sum_{i=1}^{M} \sigma_i}{\sum_{i=1}^{N} \sigma_i} \times 100 [\%]. \quad (4)$$

The cumulative contribution ratio is a numerical value dictating how precisely the texture space can express each texture when the error of the texture is evaluated by using the difference in the luminance value. If a threshold value is determined with respect to that numerical value, the value M can be automatically determined as the dimensional number necessary for exceeding the threshold value.

Next, at the storage step, the aforementioned three-dimensional shape and the eigenvectors of the aforementioned texture space are stored as the registered data.

Next, here will be described the collation procedure.

At the input image taking step, the photography device such as the video camera is used to take the two-dimensional image of the target object as the input image.

At the location and position presumption step, the location and position between the target object and the photography device and the internal parameters of the photography device are estimated as the photographic conditions at the time of taking the input image. This location and position presumption step can utilize the various manual or automatic methods.

The manual method to be utilized can be exemplified by a method, in which the parameters of the location and position are adjusted or inputted by using an interactive interface so that the image (as will be called the "CG image") generated by the computer graphics using the three-dimensional shape and the texture of the registered object and the input image of the target object may be closely registered when overlapped.

The method to be utilized for presuming the location and position automatically can be exemplified by a method, in which the location and position and the parameters of the photography device are determined by generating the CG image of the registered object in the various locations and positions, and by comparing each CG image with the input image of the target object to determine the most resembling image.

On the other hand, there can be utilized another method, in which the location and position of the target object and the parameters of the photography device are calculated in place of the comparison of the image by detecting the locations of the feature points, i.e., the feature regions or points such as the portions having luminance values varied highly on the image of the object, from the CG image of the registered object and the input image of the target object, and by determining the CG image for locating the feature points the closest.

Alternatively, there is a method, in which the location and position of the target object is determined by detecting the locations of the feature points of the target object from the input image and by utilizing the information on the locational relation between the individual feature points. In Reference 10, Shinn-Ying Ho, Hui-Ling Huang, "An is analytic solution for the pose determination of human faces from a monocular image", Pattern Recognition Letters, Vol. 19, pp. 1045-1054, 1998, there is described a method for determining the location and position, when a human face is used as an object to be collated, by using the feature points such as the eye tails or the mouth ends and by utilizing such a locational relation that the straight line joining the feature points of the two eyes and the straight line joining the feature points of the right and left mouth ends are in parallel with each other.

Further, a method of camera calibration can be utilized by registering the locations of the feature points of the registered object. This method is diversified into many methods, one of which can be exemplified by a method described in Reference 11, Roger Y. Tsai, "An Efficient and Accurate Camera Calibration Technique for 3D Machine Vision", Proc. CVPR '86, pp. 364-374, 1986.

Here will be described the illumination fluctuation space generation step and the distance calculation step.

The object collation can be executed by using the distance between an input image $\vec{I}_q$ and the illumination fluctuation space $\Psi'_j$ of an object j as a measure. Here, the illumination fluctuation space is an image space including the image fluctuation due to the illumination fluctuation when the object j is at the location and position of the input image. One example to be utilized as the distance calculation method can be exemplified by calculating the distance between the image $\vec{I}_c$ which exists in the illumination fluctuation space $\Psi'_j$ and is the closest to the input image and the input image $\vec{I}_q$. As the measure of the distance, there can be utilized various ones, one of which will be described by using the square error of the luminance value directly. These methods are just examples, and it is possible to utilize other various distance definitions and calculation methods.

At first, the illumination fluctuation space generation step generates the illumination fluctuation space by using the three-dimensional shape of the registered object, the illumination fluctuation texture space and the presumed location and position. In the prior art such as the aforementioned Method 1 or 3, the numerous illumination fluctuation images have to be generated at the illumination fluctuation space generation step, at which many calculations are required for the gradations or shadows to take a long time for the collation procedure.

In this embodiment, the illumination fluctuation space can be easily generated by converting the texture space $\Psi_j$ of the registered object in conformity to the presumed location and position. For this conversion, there can be utilized various methods, one of which generates the illumination fluctuation space by determining the transformation from the coordinate system of the texture space into the coordinate system of the input image, as follows. The value of each element of each basic vector $\vec{B}_i$ of the registered texture space $\Psi_j$ is used as the luminance value of the object surface corresponding to the element, and the three-dimensional shape of the registered object is used to generate the image in the presumed location and position. This step can be processed exclusively by the standard function of the computer graphics so that the operations can be performed at a high speed. If each image generated is a basic vector $\vec{B}'_i$, the illumination fluctuation space $\Psi'_j$ can be generated as a space defined by the basic vector group.

At the distance calculation step, a comparison image $\vec{I}_c$ can be generated as one the closest to the input image $\vec{I}_q$ in the illumination fluctuation space $\Psi'_j$ by equation (5):

$$\vec{I}_c = \sum_{i=1}^{n} (\vec{I}_q \cdot \vec{b}'_i) \vec{b}'_i. \qquad (5)$$

Here, the vector group $\{\vec{b}'_1\}$ is a basic vector group in which the vector group $\vec{B}'_i$ is orthogonally normalized.

The evaluation value D of the distance between the comparison image $\vec{I}_c$ and the input image $\vec{I}_q$ can be calculated as a square sum of the differences of the luminance values by equation (6):

$$D = |\vec{I}_q - \vec{I}_c|^2 \qquad (6).$$

At the collation decision step, the evaluation value D is used as that for the similarity between the input image and the registered data, to make the decision, for example, for confirming whether or not the target object is the registered object, for retrieving what the registered object is, and for retrieving the resembling one of the registered objects, on the basis of that evaluation value. Where it is confirmed with the simple threshold value whether or not the target object is the registered object, for example, a certain threshold value D' is determined, and it is decided, if D<D', that the target object is the registered object.

Figure 10:
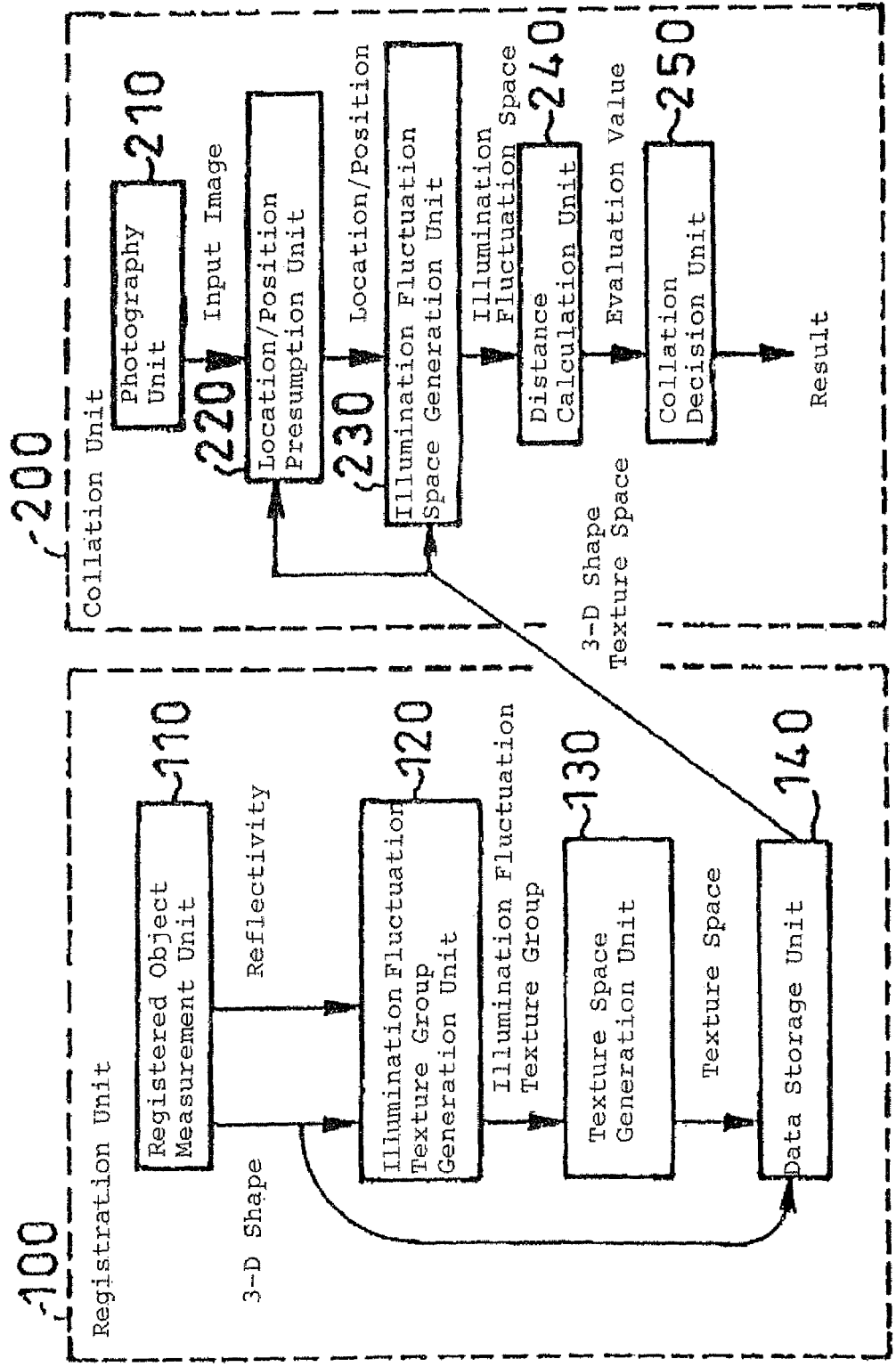
FIG. 10 is a block diagram showing the construction of an object collation apparatus according to a first embodiment of the present invention.

Here will be described the object collation apparatus for executing such object collation method. FIG. 10 is a block diagram showing the construction of an object collation apparatus according to this embodiment. This object collation apparatus is constructed to comprise a registration unit 100 and a collation unit 200. The registration unit 100 includes a registered object measurement unit 110, an illumination fluctuation texture group generation unit 120, a texture space generation unit 130 and a data storage unit 140. The collation unit 200 includes a photography unit 210, a location/position presumption unit 220, an illumination fluctuation space generation unit 230, a distance calculation unit 240 and a collation decision unit 250.

Figure 11:
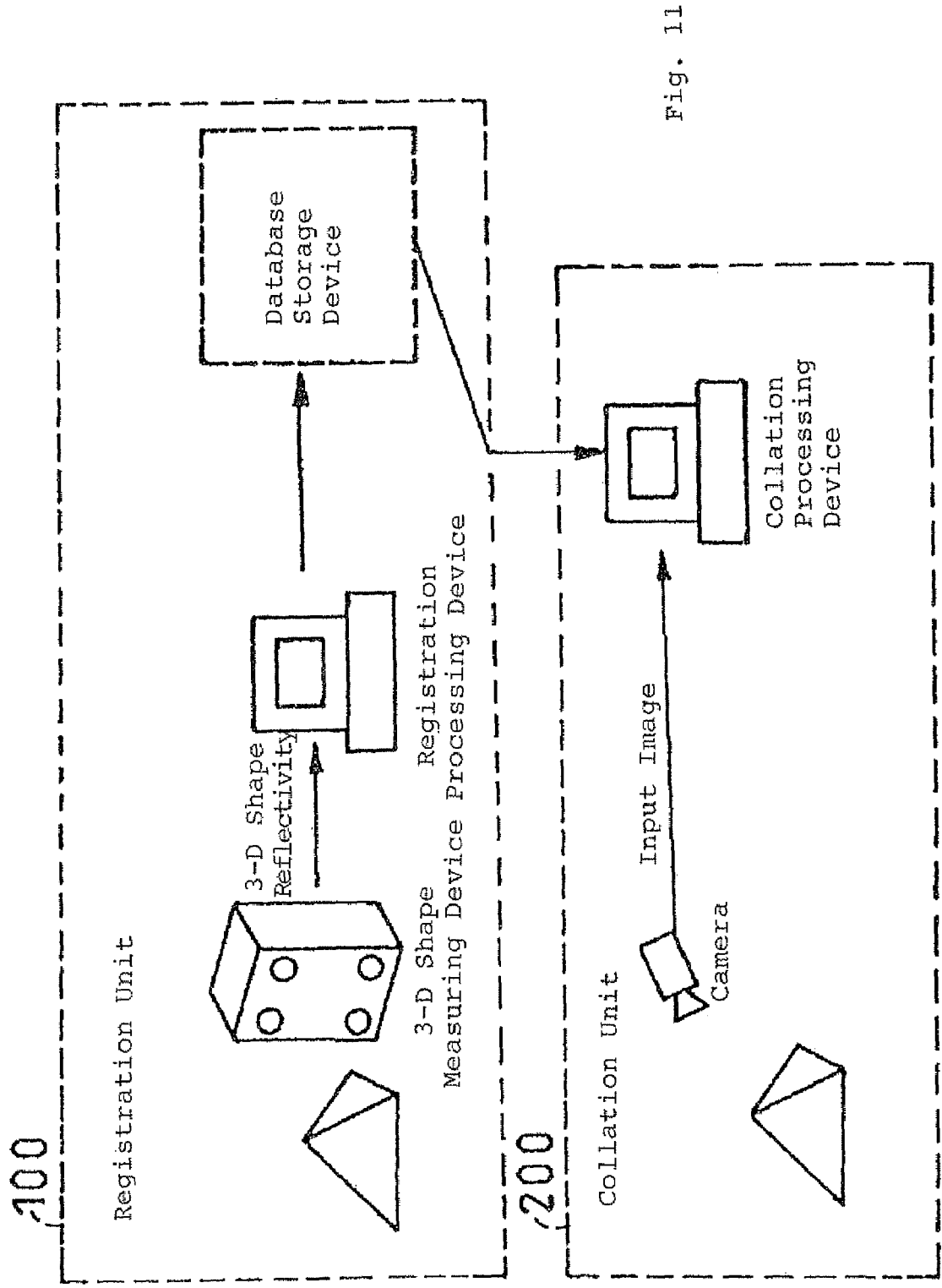
FIG. 11 is a diagram showing one example of the specific construction of the object collation apparatus shown in FIG. 10.

FIG. 11 is a diagram showing a specific construction example of the object collation apparatus. The registration unit 100 includes a three-dimensional shape measurement device, a registration processing device, a database storage device, and the like. The collation unit 200 includes a camera, a collation processing device, and the like.

As shown in FIG. 10, the registration unit 100 stores the three-dimensional shape of the object and the texture space. In the collation unit 200, a two-dimensional image is taken by using the photography device such as the video camera and is fetched by the collation processing device so that it is collated with the registered object.

Where the object collation is to be performed by using the object collation apparatus, the registration unit 100 is stored at first with the three-dimensional shape of the object, and the texture space including the fluctuations of the texture under the various illumination conditions, as the registered data to be used for the object collations.

The registered object measurement unit 110 measures not only the three-dimensional shape of the object by using the three-dimensional shape measurement device but also the reflectivity of the object surface corresponding to the three-dimensional shape or the color information corresponding to the reflectivity. The registered object measurement unit 110 to be utilized can be exemplified by the three-dimensional shape measurement device described in Reference 8. Various devices can be utilized in addition.

Figure 12:
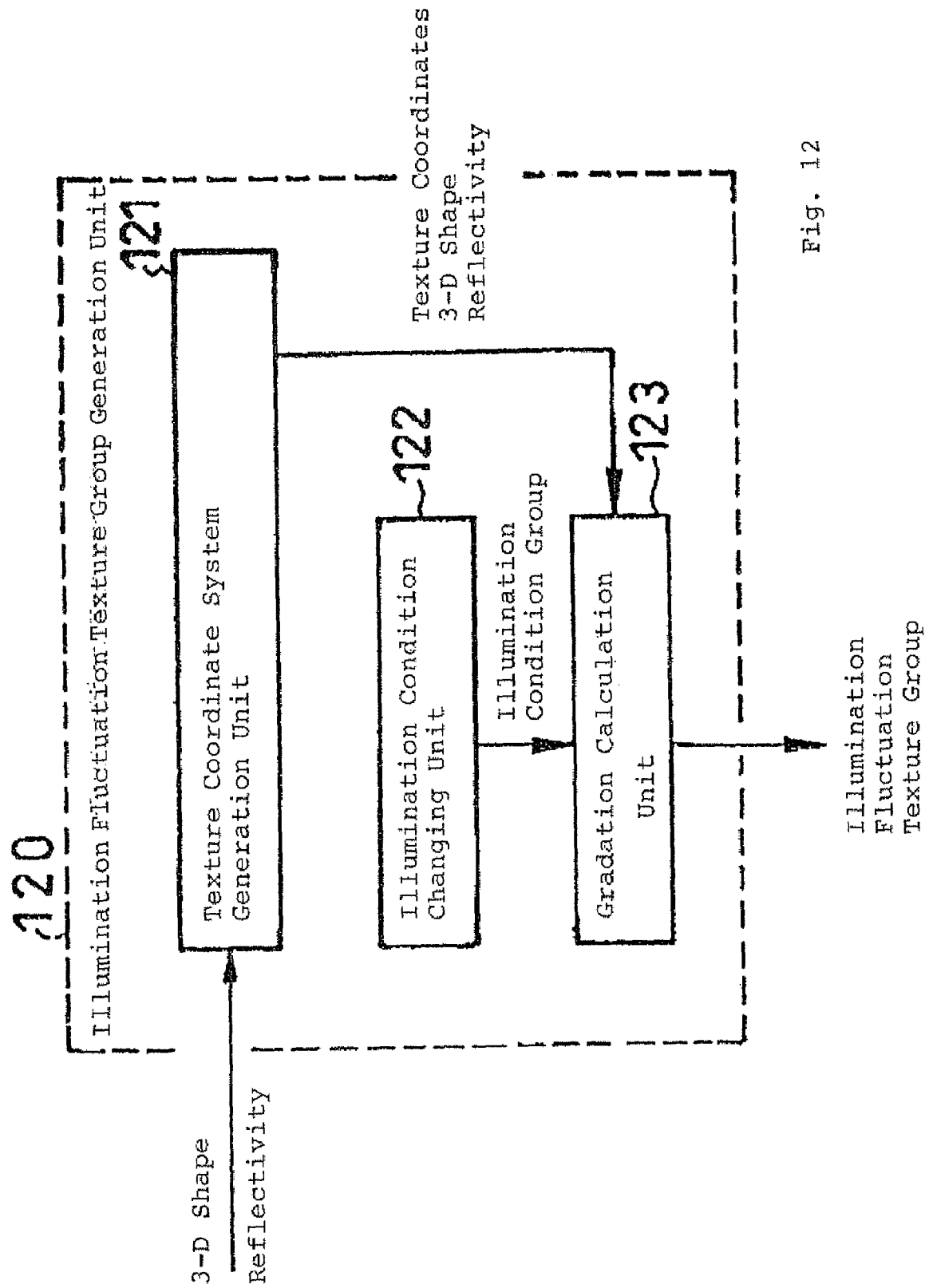
FIG. 12 is a block diagram showing the construction of an illumination fluctuation texture group generation unit.

The illumination fluctuation texture group generation unit 120 is provided, as shown in FIG. 12, with a texture coordinate system generation unit 121, an illumination condition changing unit 122 and a gradation calculation unit 123.

The texture coordinate system generation unit 121 sets the texture coordinate system as the coordinate system expressing the location of each point on the object surface independent of the location and position of the object, and outputs the shape (or the three-dimensional coordinates) and the reflectivity of the object surface for the texture coordinate (s, t). As this method for setting the texture coordinate system, there can be used various methods, one of which will be described for projections on a spherical face. As shown in FIG. 9, it is possible to utilize the aforementioned method, in which the longitude and latitude (s, t) of the projected point Q are used as the texture coordinates by assuming the sphere around the object on the center of gravity of the object and by projecting each point P on the object surface onto the sphere surface on the center of gravity. This method is just one example, and there can be additionally utilized the various methods which are suited for the object to be registered.

Figure 1:
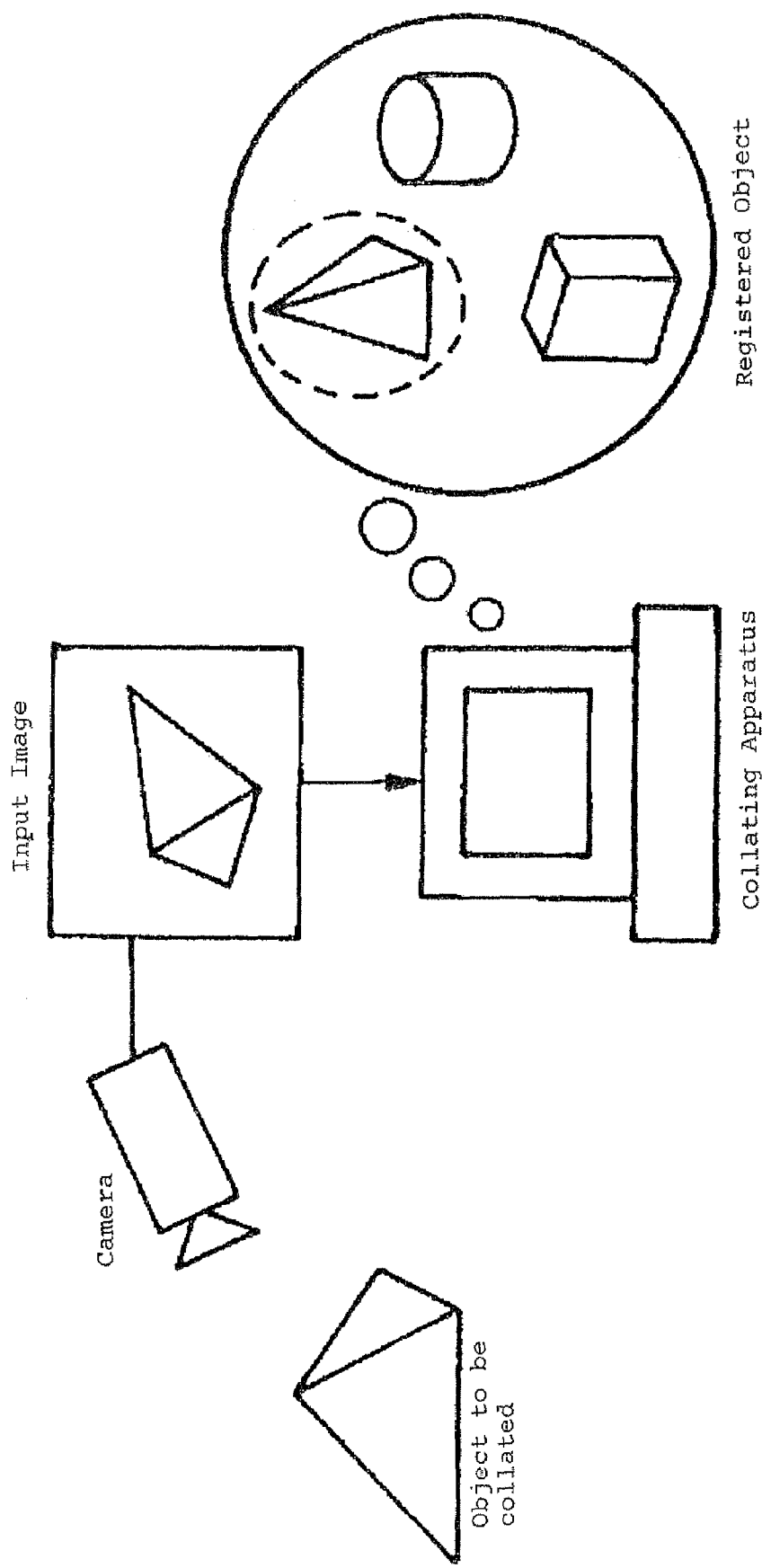
FIG. 1 is a diagram for explaining the summary of an object collation technique utilizing an image.
Figure 2:
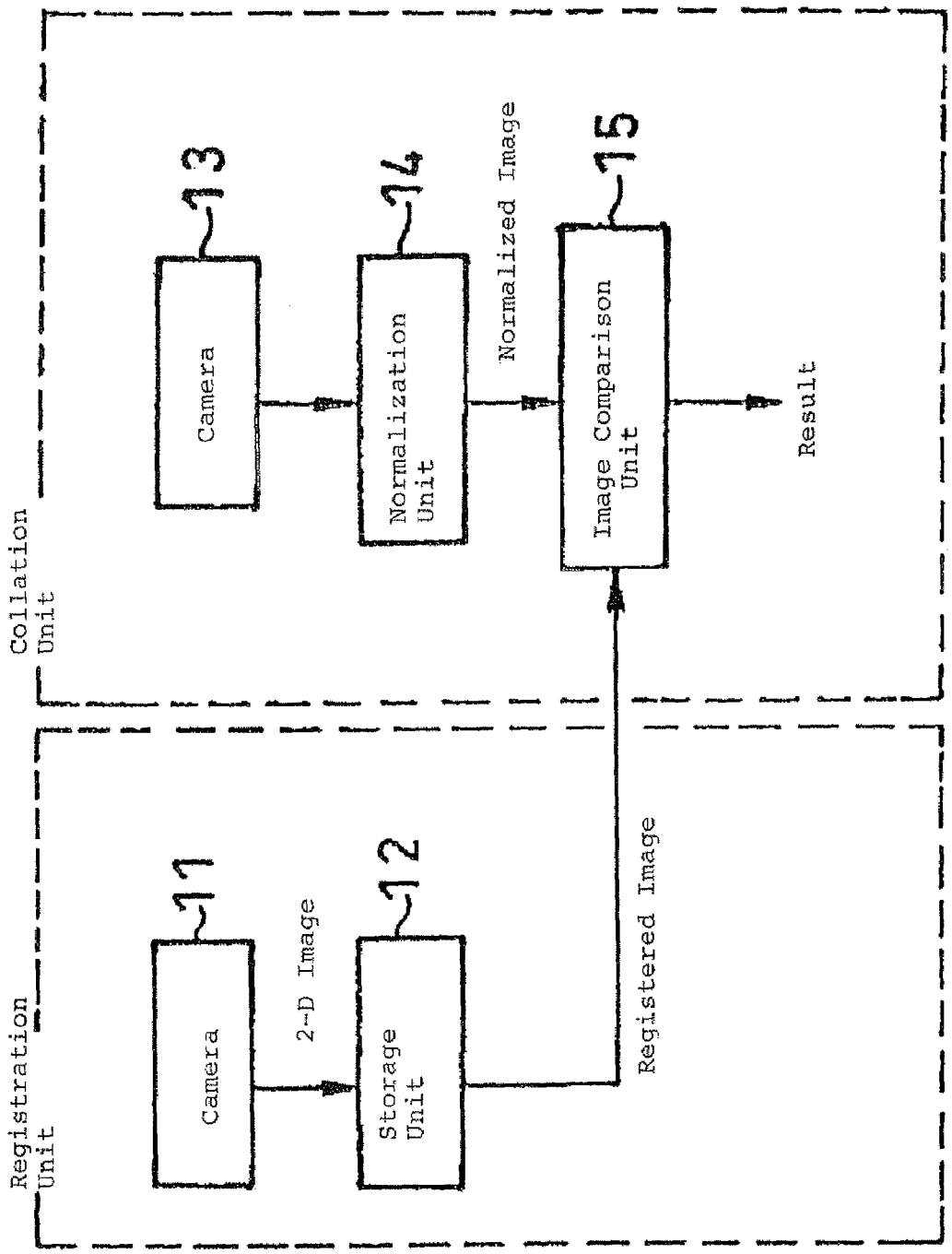
FIG. 2 is a block diagram showing one example of the construction of the object collation apparatus of the prior art using only two-dimensional images both in a registration phase and in a collation phase.
Figure 3:
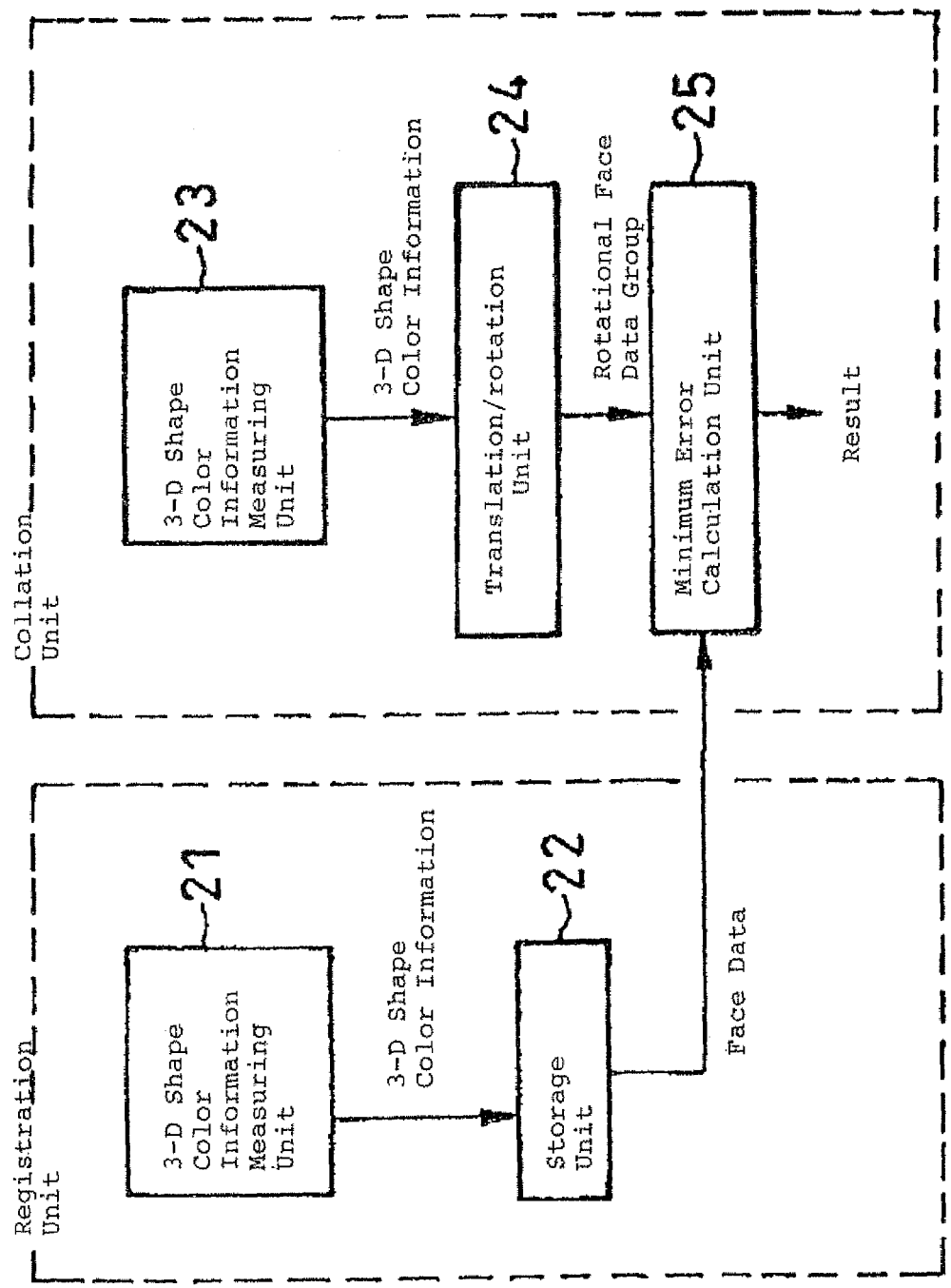
FIG. 3 is a block diagram showing one example of the construction of the object collation apparatus of the prior art measuring three-dimensional shapes both in a registration phase and in a collation phase.
Figure 4:
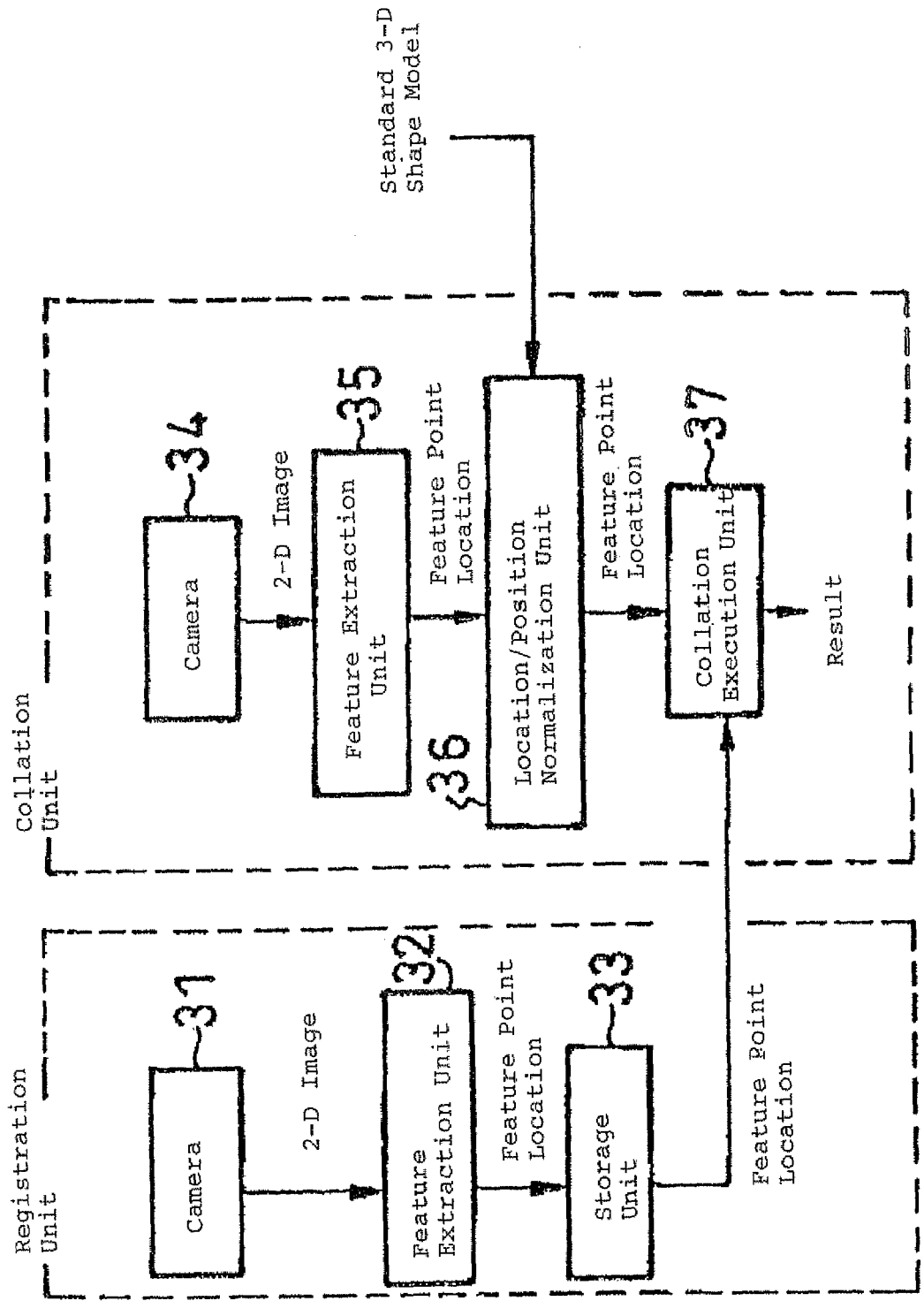
FIG. 4 is a block diagram showing one example of the construction of the object collation apparatus of the prior art taking two-dimensional images both in a registration phase and at a collation phase and using a standard three-dimensional shape model for correcting the location and position.
Figure 5:
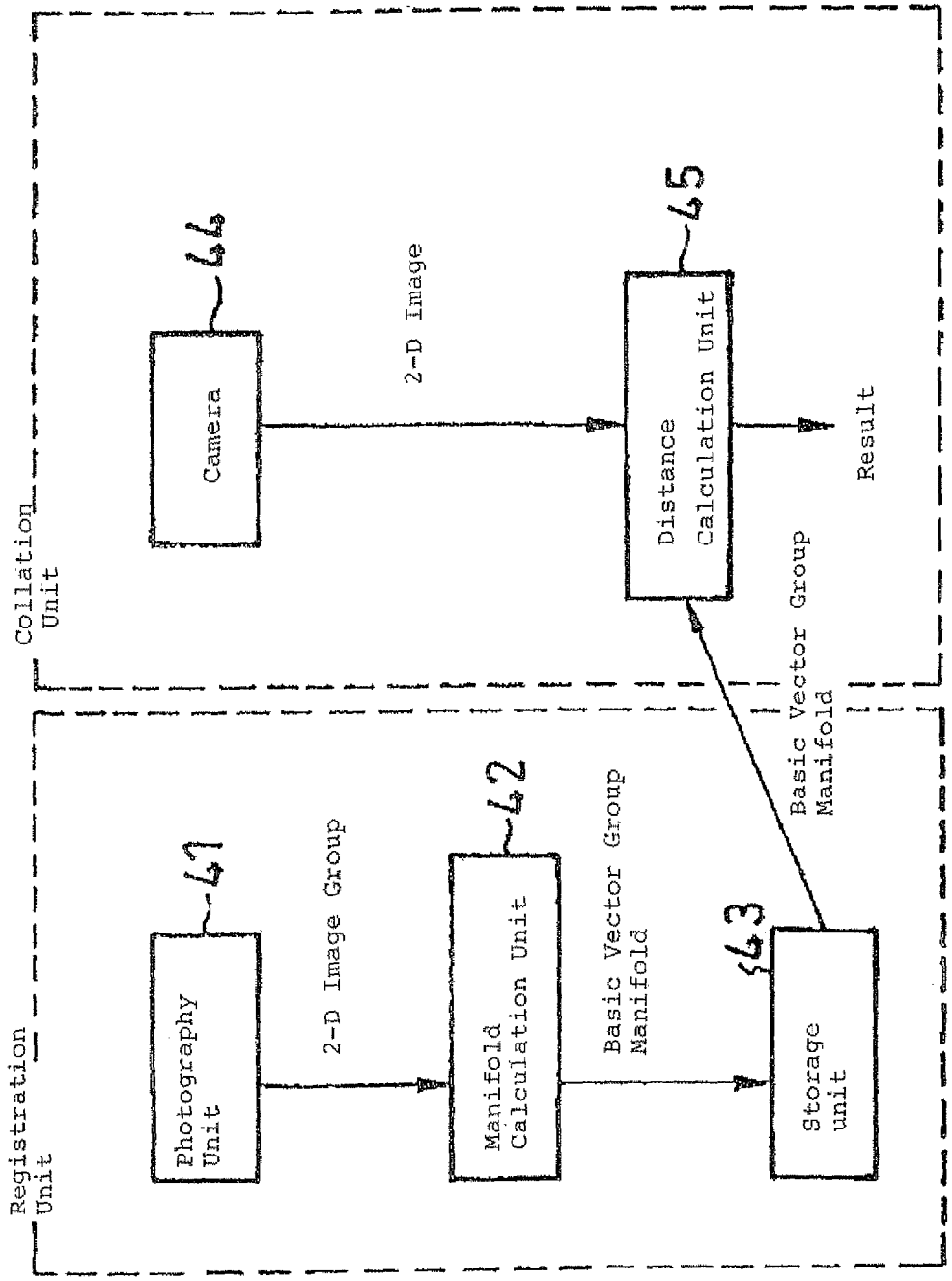
FIG. 5 is a block diagram showing one example of the construction of the object collation apparatus of the prior art taking and recognizing images at numerous locations and positions and under illumination conditions in the registration phase.
Figure 6:
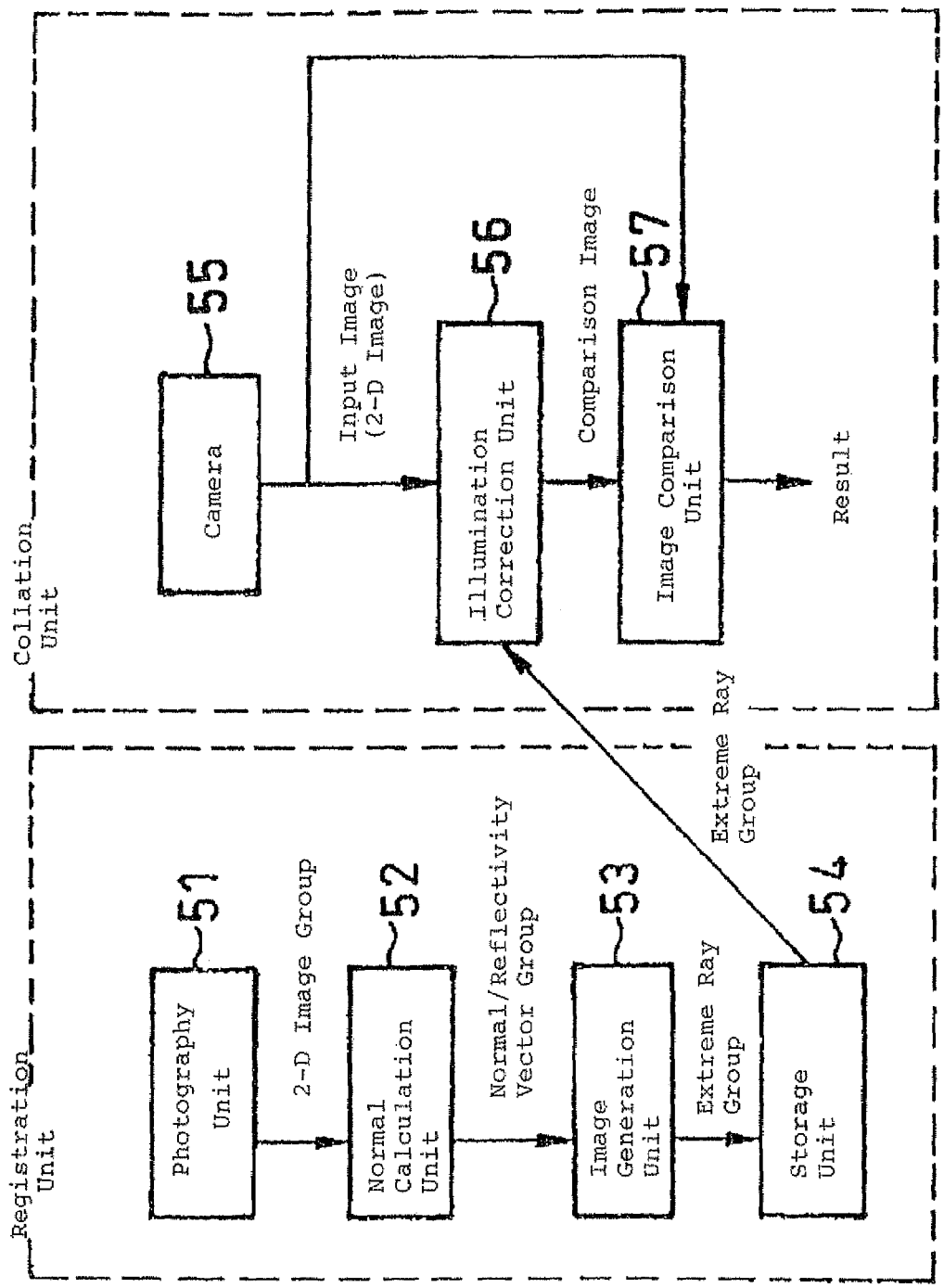
FIG. 6 is a block diagram showing one example of the construction of the object collation apparatus of the prior art taking two-dimensional images under a plurality of illumination conditions in the registration phase and correcting the illumination conditions.
Figure 7:
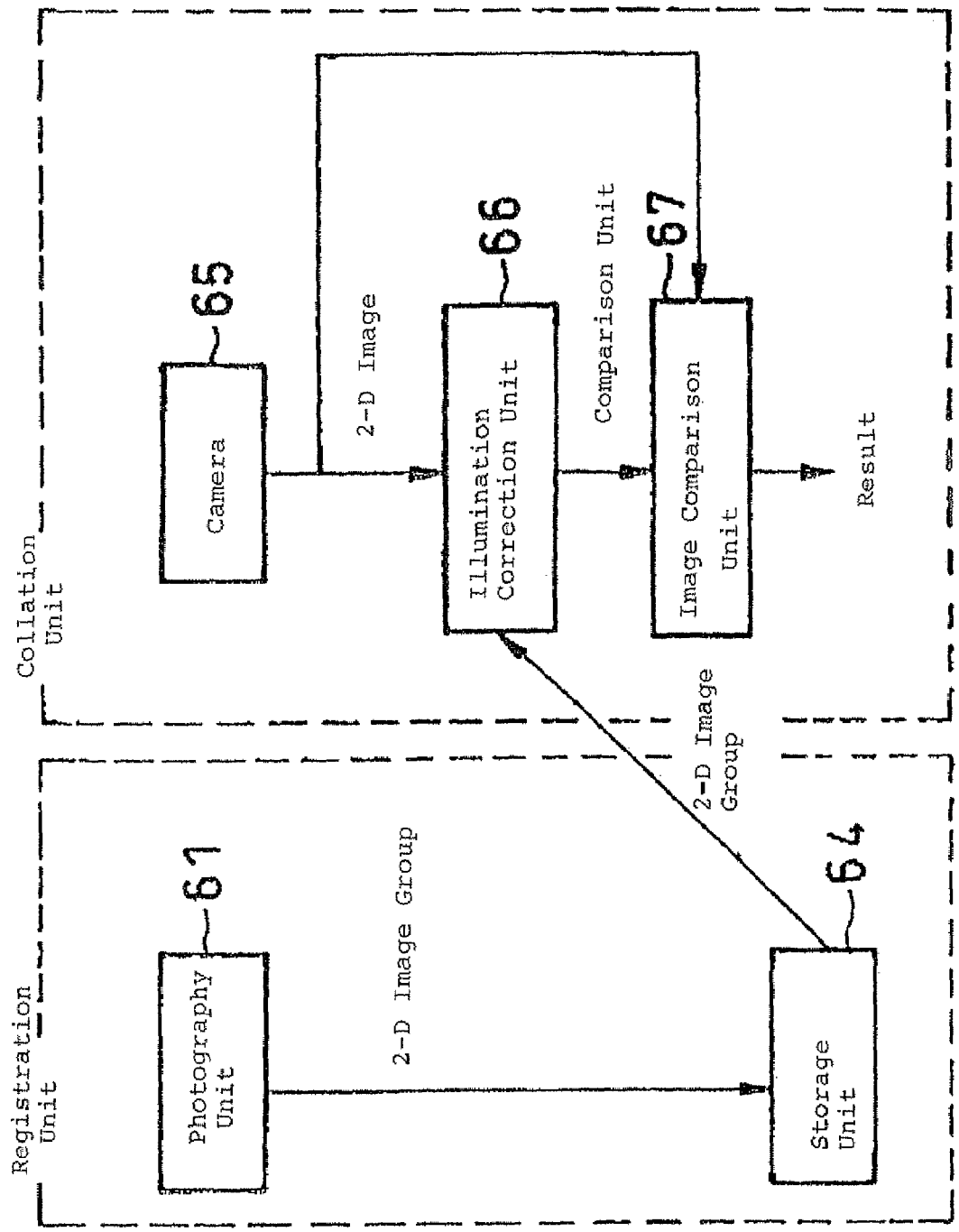
FIG. 7 is a block diagram showing one example of the construction of the object collation apparatus of the prior art taking two-dimensional images under various illumination conditions in the registration phase and correcting the illumination conditions.
Figure 8:
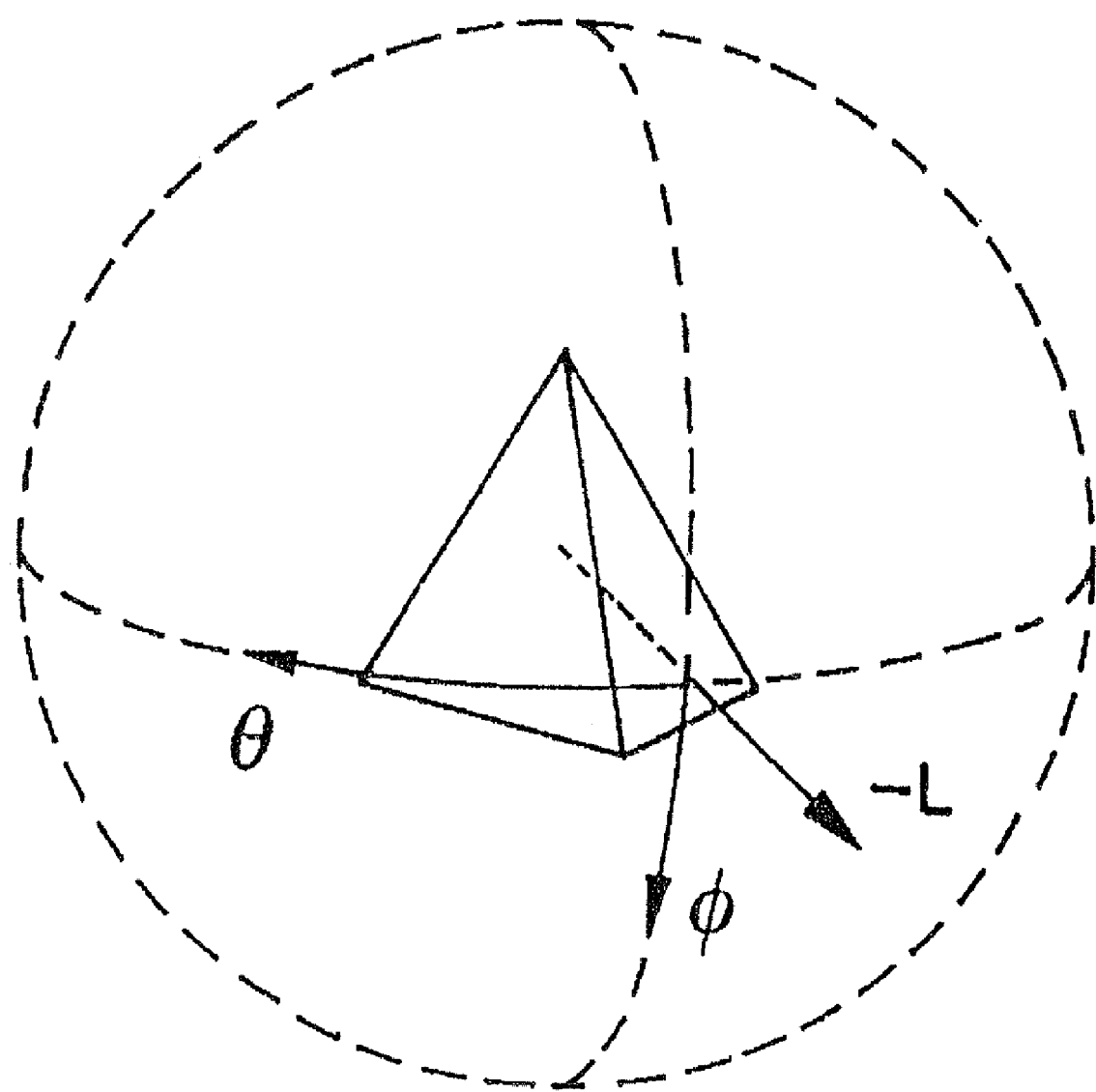
FIG. 8 is a diagram for explaining the angles indicating the directions of illuminations for determining the illumination conditions with respect to an object.

The illumination condition changing unit 122 sets a sufficient number of illumination condition groups for approximating the illumination fluctuation space. For example, 361 kinds of illumination condition groups are totally set by assuming one point light source at an infinite distance to indicate the direction of the light source with angles ($\theta$, $\phi$) indicating the longitude and latitude of the sphere on the object, as illustrated in FIG. 8, and by changing the longitude $\theta$ and the latitude $\phi$ at every 10 degrees from −90 degrees to +90 degrees. These determinations of the kind of the light source and the set interval and range of the illumination direction are just examples so that they can be changed in various manners.

The gradation calculation unit 123 reads in the three-dimensional shape and the reflectivity of the object j and generates the illumination fluctuation texture group in the illumination condition group, as inputted from the illumination condition changing unit 122, by using the function of the computer graphics. This processing can be realized, for example, by the fundamental function of the computer having the computer graphics function. In the image generation using the computer graphics, it is possible to use various object surface reflection models and camera models. For example, the camera model can be exemplified by a pin-hole camera model, and the reflection model of the object surface can be exemplified by the completely scattering model. These models are just examples, and other various reflection models can be used to shadow or brighten by the ray tracing. In this image generation, the collation performance can be improved by making the reflecting characteristics of the object surface or the model of the light source more real. Alternatively, this image generation can be realized not by the computer graphics but by the numerical calculations.

The texture space generation unit 130 calculates the texture space which is an image space including the fluctuations of the texture when the illumination conditions change variously, from the illumination fluctuation texture group thus generated. For these calculations, there can be utilized various methods, one of which will be described by utilizing the principal component analysis to express the texture space as a linear space of lower dimensions.

The texture space is computed according to the foregoing equation (3) from the illumination fluctuation texture group generated by the illumination fluctuation texture group generation unit 120, and the calculated basic vector group is outputted as the texture space $\Psi_j$ of the object. Here, the M-number of basic vectors are determined in the sequence of the larger eigenvalues and are outputted as the texture space $\Psi_j$ of the object j. In order to decide the number M of the basic vectors as such a value that the cumulative contribution ratio calculated by the foregoing equation (4) may exceed 95%, the number M is determined to satisfy the following Formula, when the pixel number is 361 equal to the number of the images of the illumination fluctuation texture group or less, by determining an N-number of eigenvalues for the pixel number N:

$$\frac{\sum_{i=1}^{M} \sigma_i}{\sum_{i=1}^{361} \sigma_i} \geq 0.95$$

The number M could be determined in different manners by applying various standards.

The data storage unit 140 stores and holds the registered three-dimensional shape and the texture spaces of each object, and reads out them for the processing of the collation unit 200.

The object having been processed by the registration unit 100 is collated by using the image at the collation unit 200, as will be described in the following. This collation unit 200 is provided, as described above, with the photography unit 210, the location/position presumption unit 220, the illumination fluctuation space generation unit 230, the distance calculation unit 240 and the collation decision unit 250. As shown in FIG. 11, moreover, the collation unit 200 takes the input image of a target object by utilizing the photography device such as the camera and fetches the taken image in the collation device for executing the collations.

The photography unit 210 takes the input image of the target object by using the photography device such as the camera or the video camera.

The location/position presumption unit 220 presumes the parameters such as the location and position of an object and the photography device, i.e., the photographic conditions when the input image was taken. As the location and position parameters, for example, there are used a translation distance $(T_x, T_y, T_z)$ and a rotation angle $(R_x, R_y, R_z)$ of the object, and the focal distance f and the angle of visibility $\alpha$ of the camera.

Moreover, the processing apparatus is further provided with an interactive interface for the user to adjust those parameters manually while observing the screen. In the screen, there is superposed and displayed the image of the registered object, as generated by the computer graphics, and the input image of the target object by using those eight parameters by the superimposition method. The user determines the proper parameters by adjusting the values of those eight parameters so that the two images may be precisely registered. This interactive interface is just one example, and various modes could be utilized. Alternatively, the location/position parameters could be automatically calculated not by using that interactive interface.

The illumination fluctuation space generation unit 230 utilizes the result of the location/position presumption unit 220 to generate the illumination fluctuation space which is an image space including the image fluctuations of the object under the various illumination conditions for the same location and position as those of the input image. Specifically, the illumination fluctuation space is generated by transforming the registered texture space $\Psi_j$ in conformity to the presumed location and position. For this transformation, there can be utilized various methods, one of which is exemplified by determining the transformation from the coordinate system of the texture space into the coordinate system of the input image to generate the illumination fluctuation space, as will be described in the following.

The image group at the presumed location and position is generated by using the values of the individual elements of the individual basic vectors $\vec{B}_i$ (i=1,2, ..., M) of the registered texture space $\Psi_j$ as the luminance values of the object surface, as corresponding to the elements, and by using the registered three-dimensional shape. This step can be processed exclusively by the standard function of the computer graphics so that the operations can be performed at a high speed. If the individual images generated are used as they are as the basic vectors $\vec{B}'_i$, it is possible to generate the illumination fluctuation space $\Psi'_j$ as the space which is defined by the basic vector group $\{\vec{B}'_i\}$. The generated basic vector group $\{\vec{B}'_i\}$ is orthogonally normalized to calculate the basic vector group $\{\vec{b}'_i\}$ making the normalized orthogonal system.

The distance calculation unit 240 generates the comparison image $\vec{I}_c$ as the image the closest to the input image $\vec{I}_q$ in the illumination fluctuation space $\Psi'_j$ by the foregoing equation (5), and calculates and outputs the evaluation value D of the distance between the comparison image $\vec{I}_c$ and the input image $\vec{I}_q$ by the foregoing equation (6).

The collation decision unit 250 executes the decisions, on the basis of the evaluation value D of the similarity between the input image and the registered data, confirming whether or not the target object is the registered object, for retrieving what the registered object is, and for retrieving the resembling one of the registered objects. Where it is confirmed with the simple threshold value whether or not the target object is the registered object, a certain threshold value D' is determined, and it is decided, if D<D', that the target object is the registered object.

The distance calculation method and the collation decision method thus far described are just examples, and other various methods could be applied.

Figure 13:
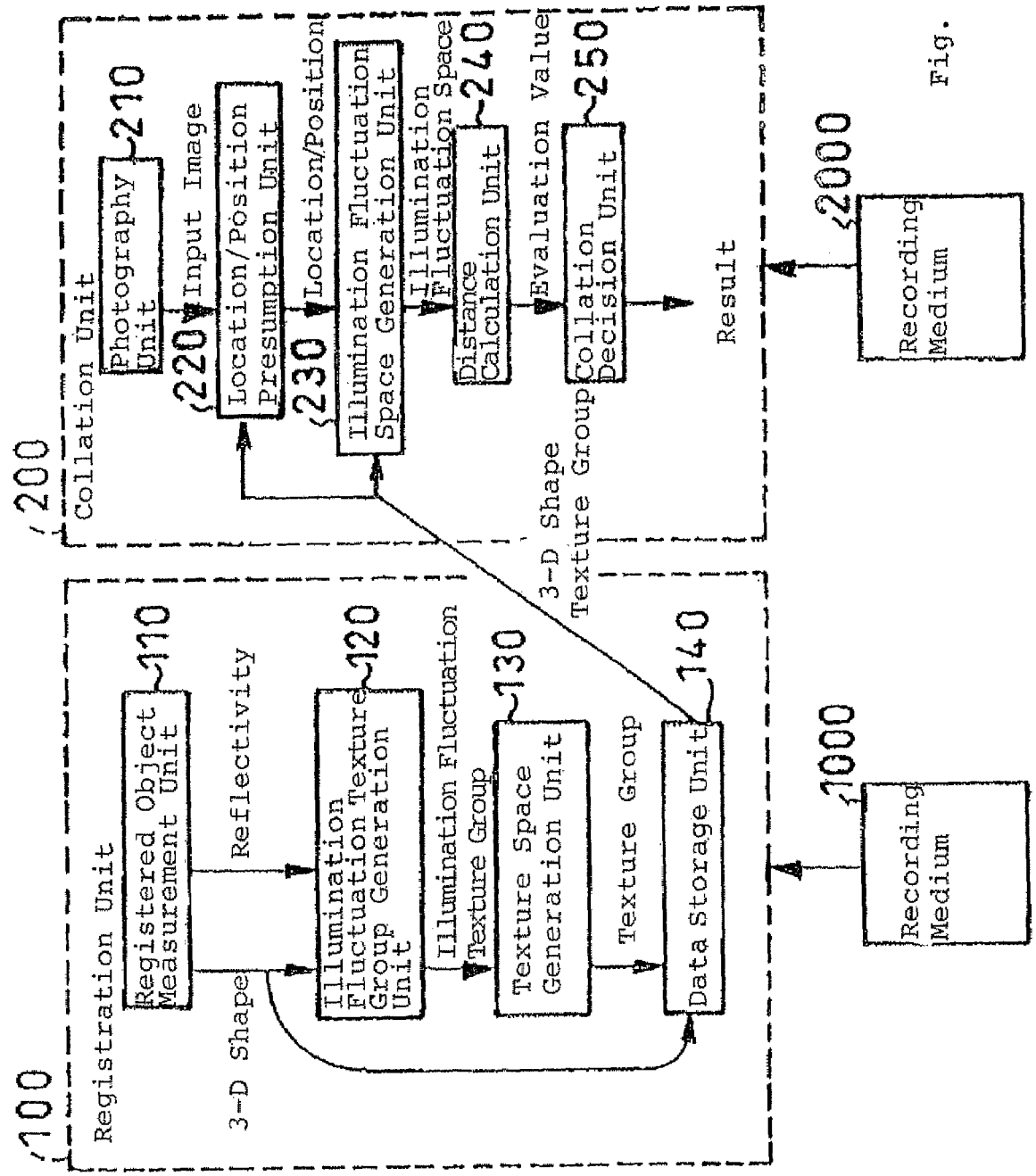
FIG. 13 is a block diagram showing another example of the objection collation apparatus of the first embodiment.

The object collation apparatus thus far described can be realized with the software by using the general-purpose computer system such as a personal computer. FIG. 13 is a block diagram showing the construction of an object collation apparatus realized by using the computer system. This object collation apparatus is different from that shown in FIG. 10 in that the registration unit 100 is provided with a recording medium 1000 recorded with the registration programs, and in that the collation unit 200 is provided with a recording medium 2000 recorded with the collation programs. Each of these recording media 1000 and 2000 may be exemplified by a magnetic disk, a semiconductor memory or other recording media.

The registration programs are read from the recording medium 1000 in the computer constructing the registration unit 100 to control the actions of the computer as the registered object measurement unit 110, the illumination fluctuation texture group generation unit 120, the texture space generation unit 130 and the data storage unit 140. By the controls of the registration programs, there are realized the same actions of the registration unit 100 as the aforementioned ones.

Likewise, the collation programs are read from the recording medium 2000 in the computer constructing the collation unit 200 to control the actions of the computer as the collation unit 200 including the photography unit 210, the location/position presumption unit 220, the illumination fluctuation space generation unit 230, the distance calculation unit 240 and the collation decision unit 250. By the controls of the collation programs, there are realized the same actions of the collation unit 200 as the aforementioned ones.

Second Embodiment

The object collation method in the second embodiment of the invention is similar to the method in the first embodiment. The method in the second embodiment is, However, different from the method in the first embodiment in that the registered object measurement step includes the three-dimensional shape measurement step of measuring the three-dimensional shape of the registered object, and the texture photography step of photographing the luminance and the color information of each location of the object surface to generate the texture group by setting the various illumination conditions practically. Further, the method in the second embodiment does not have the texture group generation step but uses the photographed texture group in place of the generation step. Here, the registration procedure is enabled to photograph the illumination fluctuation texture group not by measuring the three-dimensional shape of the registered object and the surface reflectivity to generate the illumination fluctuation texture group but by setting the various illumination conditions practically to take the image of the object.

Specifically, this embodiment utilizes the following fact. If the illumination conditions of a suitable number capable of photographing an illumination fluctuation texture group sufficient for generating a texture space including the fluctuations due to the illumination conditions of the texture of the registered object are set and if the image information is photographed under those illumination conditions, the texture group for generating the illumination fluctuation space can be generated without the processing for measuring the reflectivity, for setting the illumination conditions in the image generation by the computer graphics or for generating the shadow by the ray tracing.

One method to be used for the texture image photography is exemplified as follows. A semicircular scaffold is disposed in front of the registered object, and a suitable number of lamps are attached at an equal interval to the scaffold. Then, the image is taken while flashing the individual lamps. In one of other various methods, the image can be taken by moving the lamps on a manipulator.

Figure 14:
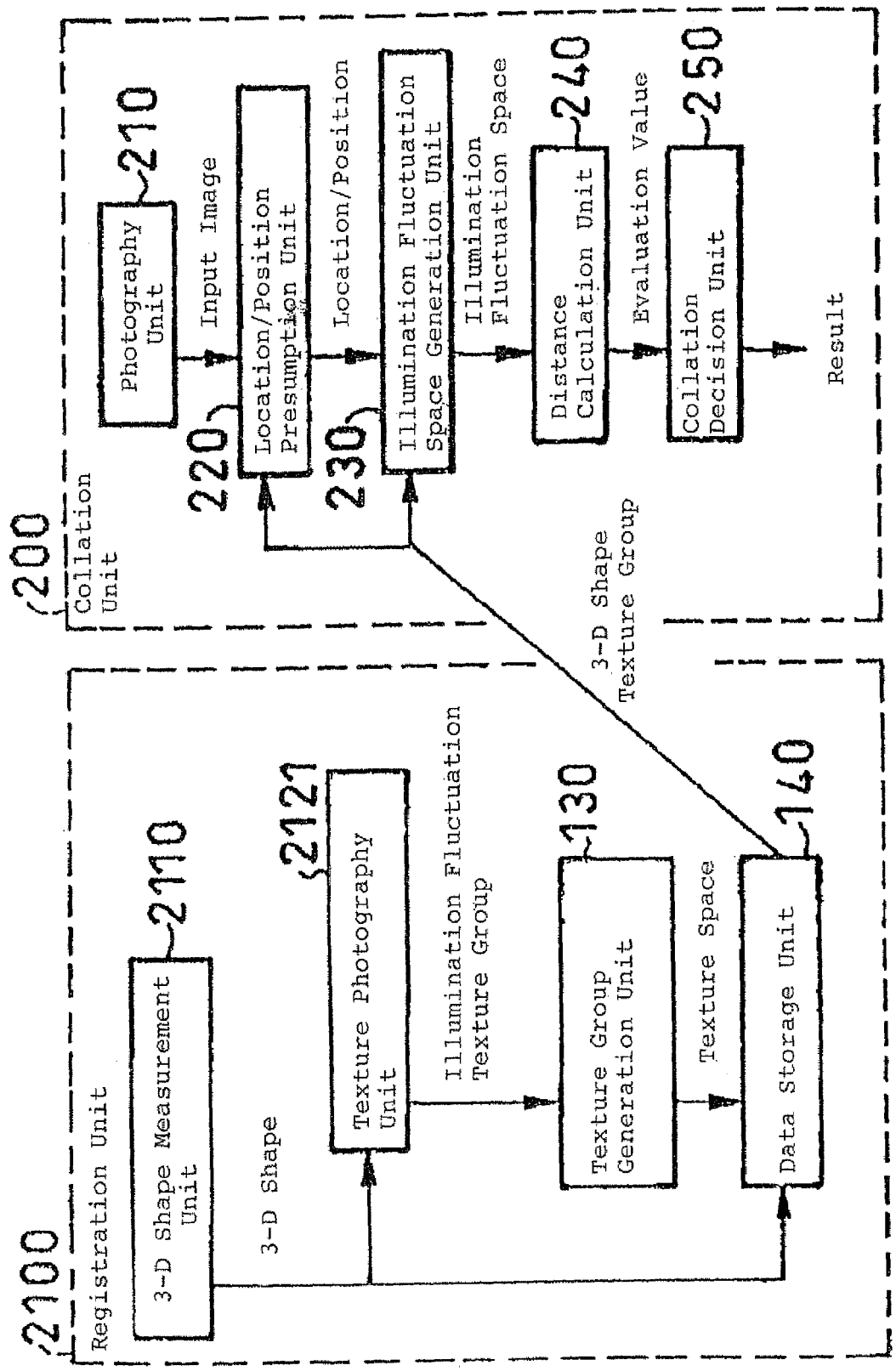
FIG. 14 is a block diagram showing the construction of an object collation apparatus according to a second embodiment of the present invention.

Here will be described the object collation apparatus for executing such object collation method. FIG. 14 is a block diagram showing the construction of the object collation apparatus in this embodiment. This object collation apparatus is constructed to comprise a registration unit 2100 and the collation unit 200. The registration unit 2100 includes a three-dimensional shape measurement unit 2110, a texture photography unit 2121, the texture space generation unit 130 and the data storage unit 140. The collation unit 200 includes the photography unit 210, the location/position presumption unit 220, the illumination fluctuation space generation unit 230, the distance calculation unit 240 and the collation decision unit 250. Here, the texture space generation unit 130 and the data storage unit 140 are absolutely identical to those of the first embodiment. Further, the collation unit 200 is also identical to that of the first embodiment.

This object collation apparatus is different from that of the first embodiment in that, in place of the measurement of the reflectivity at the registered object measurement unit 110, the texture photography unit 2121 for taking the image under a plurality of illumination conditions is provided to generate the illumination fluctuation texture group by using the taken images in place of the reflectivity, and in that the illumination condition changing unit 122 is omitted.

Where the object is to be collated by using the object collation apparatus, the registration unit 2100 is registered at first with the three-dimensional shape and the image data of the registered object under the plurality of the illumination conditions as the registered data of the registered object.

The three-dimensional shape measurement unit 2110 measures, like the registered object measurement unit 110 in the first embodiment, the three-dimensional shape of the registered object by using the three-dimensional shape measurement device described in Reference 8, but does not measure the reflectivity.

The texture photography unit 2121 takes the image group of the registered object by practically setting the illumination conditions similar to those outputted from the illumination condition changing unit 122 in the first embodiment, generates the texture coordinate system by using the three-dimensional shape by a method similar to that of the aforementioned illumination fluctuation texture group generation unit 120, and outputs the illumination fluctuation texture group by converting the image group into the texture coordinate system. For example, a semispherical scaffold is placed around and in front of the registered object, and a suitable number of lamps are attached at a suitable interval to the scaffold. To the registered object, for example, there are attached the lamps at an interval of 15 degrees at angles ($\theta$, $\phi$), as shown in FIG. 8, for the $\theta$ and $\phi$ ranging from −90 degrees to +90 degrees, and the images are taken one by one by turning ON the individual lamps. The photography method and the illumination position setting method are just examples, and other various method can be utilized including one in which the image is taken while moving the lamps on the manipulator. The texture photography unit 2121 outputs the image group taken by the aforementioned method, as the illumination fluctuation texture group.

After this, like the case of the first embodiment, the operations are performed at the texture space generation unit 130 and the data storage unit 140. The operation of the collation unit 200 at the collation time is performed, as described in the first embodiment.

Figure 15:
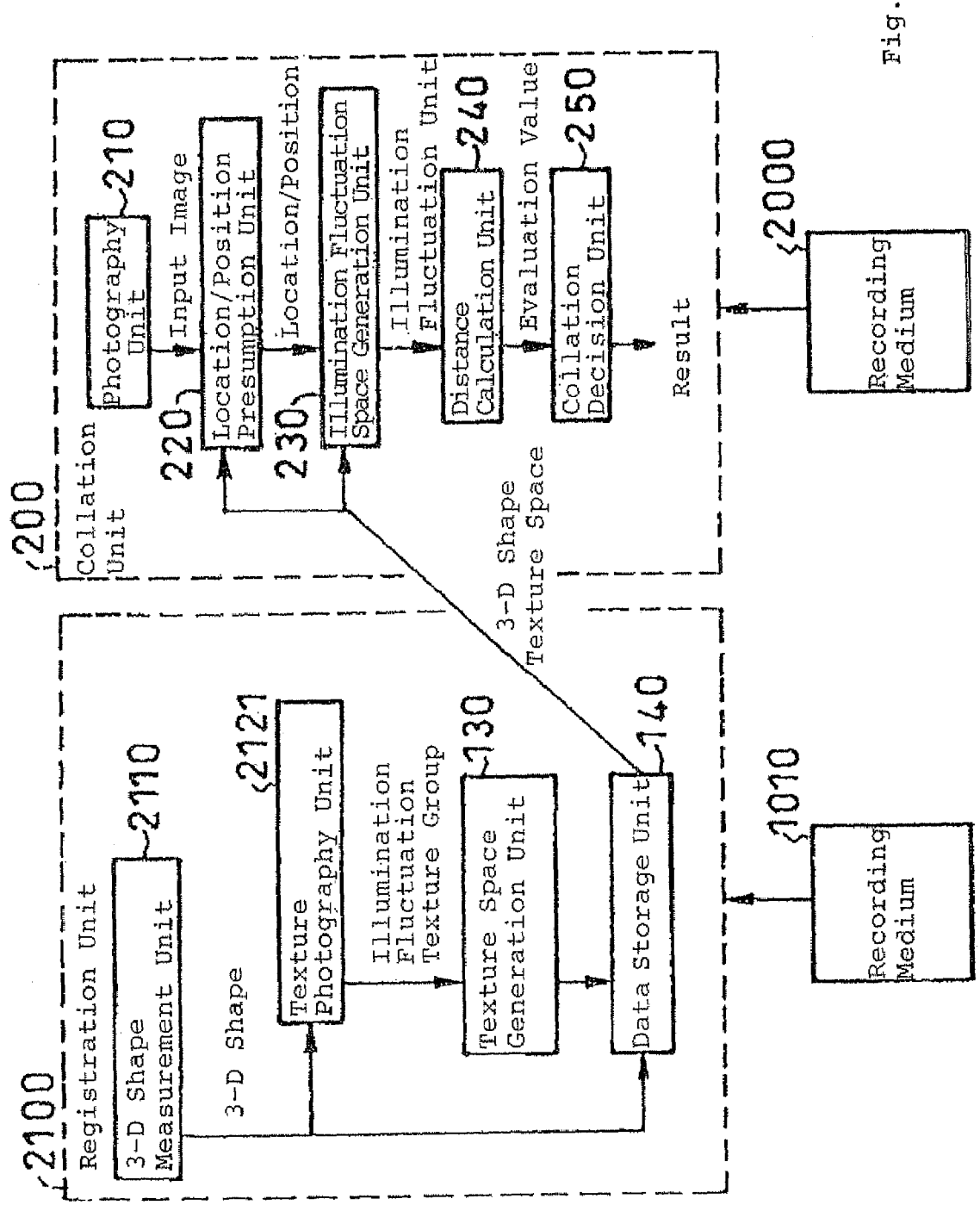
FIG. 15 is a block diagram showing another example of the objection collation apparatus of the second embodiment.

The object collation apparatus thus far described can also be realized with the software by using the general-purpose computer system such as the personal computer. FIG. 15 is a block diagram showing the construction of the object collation apparatus, as is realized by using the computer system. This object collation apparatus is different from that shown in FIG. 14 in that the registration unit 2100 is provided with a recording medium 1010 recorded with the registration programs, and in that the collation unit 200 is provided with the recording medium 2000 recorded with the collation programs. These recording media 1010 and 2000 may be the magnetic disk, the semiconductor memory or other recording media.

The registration programs are read from the recording medium 1010 in the computer constructing the registration unit 2100, and controls the actions of the computer as the three-dimensional shape measurement unit 2110, the texture photography unit 2121, the texture space generation unit 130 and the data storage unit 140. The same actions of the registration unit 2100 as the aforementioned ones are realized by the controls of the registration programs.

The collation programs are read from the recording medium 2000 in the computer constructing the collation unit 200, and controls the actions of the computer as the collation unit 200 including the photography unit 210, the location/position presumption unit 220, the illumination fluctuation space generation unit 230, the distance calculation unit 240 and the collation decision unit 250. The same actions of the collation unit 200 as the aforementioned ones are realized by the controls of the collation programs.

Third Embodiment

The object collation method of the third embodiment is different from that of the first or second embodiment in that the illumination fluctuation space generation step is omitted and replaced by an input texture generation step of converting the input image into the texture by using the three-dimensional shape and the presumed location and position, and in that the distance calculation step calculates the distance between the input texture and the texture space. Here, in place of the generation of the illumination fluctuation space by converting the texture space to adjust the location and position to the input image, the coordinate transformation from the coordinate system of the input image into the coordinate system of the texture space is determined by using the three-dimensional shape and the presumed location and position, to convert the input image into the input texture by the coordinate transformation so that the distance between the input texture and the texture space can be used as the evaluation value of the object collation.

For determining the coordinate transformations, there can be utilized various methods, one of which is exemplified by adopting the color determined uniquely by the coordinate system of the texture space as the corresponding color of the object surface, and by using the three-dimensional shape of the registered object to generate the image in the presumed location and position. This step can be processed exclusively by the standard function of the computer graphics so that the operations can be performed at a high speed. The color of each pixel of the generated image indicates the texture coordinate corresponding to the pixel so that the transformation from the coordinate system of the input image to the coordinate system of the texture space can be easily generated.

Figure 16:
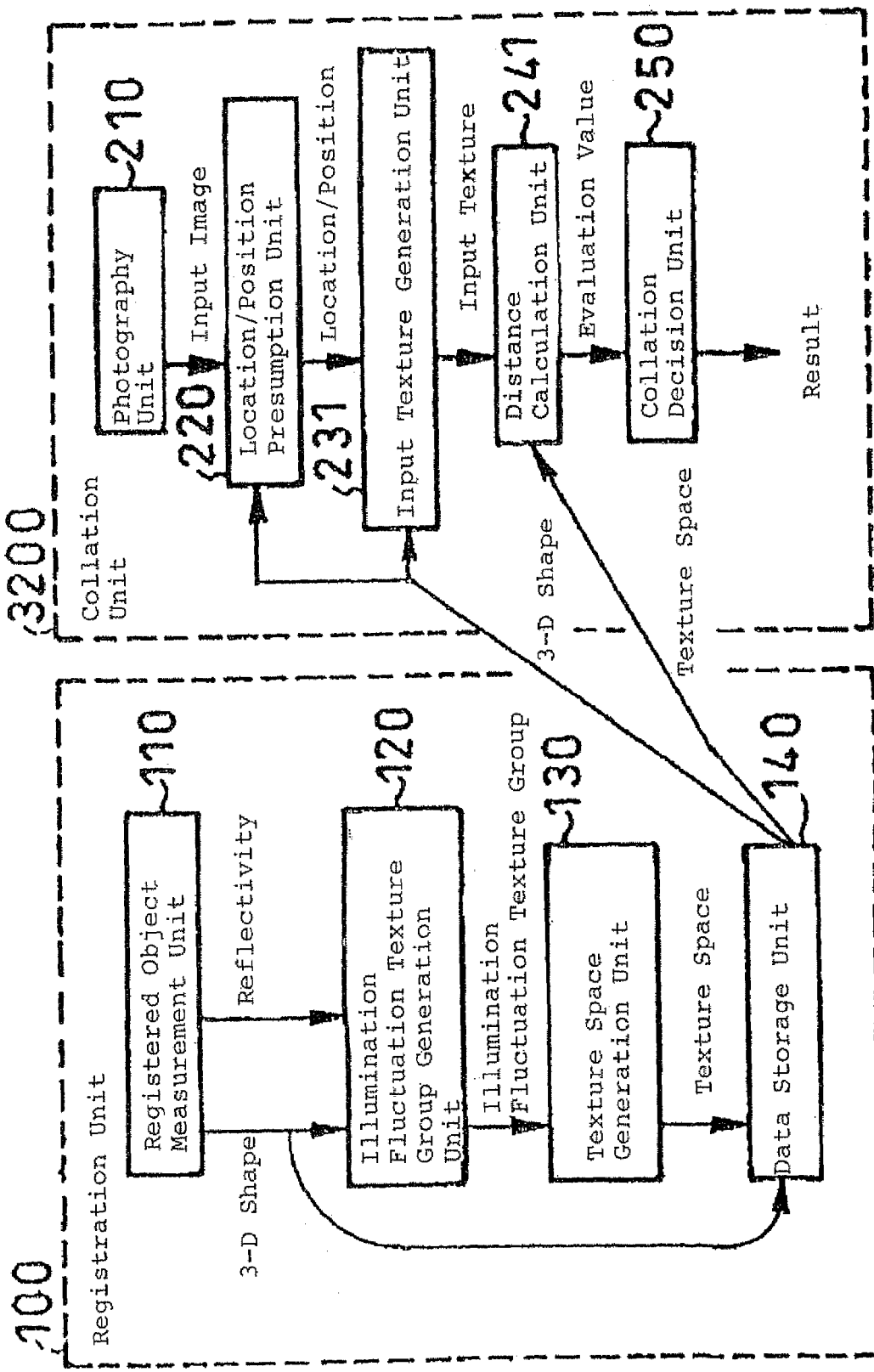
FIG. 16 is a block diagram showing the construction of an object collation apparatus according to a third embodiment of the invention.

Here will be described the object collation apparatus for executing such object collation method. FIG. 16 is a block diagram showing the construction of the object collation apparatus in this embodiment. This object collation apparatus is constructed to comprise the registration unit 100 and a collation unit 3200. The registration unit 100 is equivalent to the registration unit in the first embodiment, and includes the registered object measurement unit 110, the illumination fluctuation texture group generation unit 120, the texture space generation unit 130 and the data storage unit 140. On the other hand, the collation unit 3200 includes the photography unit 210, the location/position presumption unit 220, an input texture generation unit 231, a distance calculation unit 241 and the collation decision unit 250. Specifically, the collation unit 3200 is different from the collation unit 200 in the first embodiment in that the illumination fluctuation space generation unit 230 is omitted and replaced by the input texture generation unit 231, and in that the distance calculation unit 241 calculates the distance between the input texture, as converted from the input image, and the texture space.

Here will be described the collation of an object by using the object collation apparatus. The processing at the registration unit 100 is identical to that of the first embodiment. In the collation unit 3200, the processing from the photography unit 210 to the location/position presumption unit 220 is absolutely identical that of the first embodiment. Then, the input texture generation unit 231 generates the input texture by utilizing the result of the location/position presumption unit 220 to convert and deform each pixel of the input image into the texture coordinate. For this conversion, there can be utilized various methods, one of which can be exemplified by the following method for generating the illumination fluctuation space by determining the transformation from the coordinate system (u, v) of the input image into the coordinate system (s, t) of the texture space.

Figure 17:
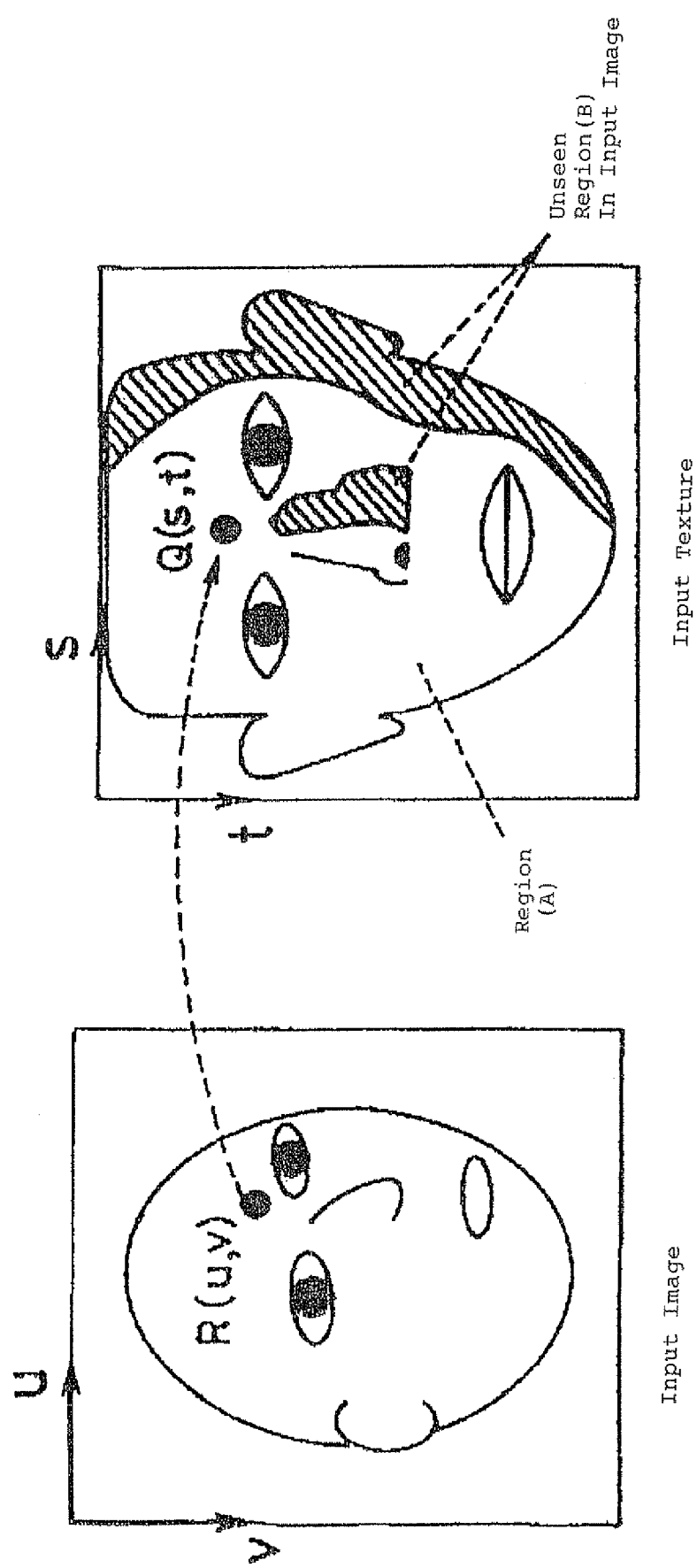
FIG. 17 is a diagram for explaining the conversion from input image coordinates to texture coordinates in an input texture generation unit.

For the three-dimensional shape registered, there is defined an imaginary object, to which a color determined uniquely by the texture coordinate (s, t) is assigned to the color of the object surface, to generate the image at the location and position presumed. This processing can be executed exclusively by the standard function of the computer graphics so that the operations can be performed at a high speed. In view of the color of each pixel R(u, v) of the generated image, the texture coordinate Q(s, t) is determined so that the coordinate transformation is determined from the coordinate system (u, v) of the input image into the texture coordinate (s, t), as shown in FIG. 17. This transformation is applied to all the pixels to be collated on the input image, to generate the input texture $\vec{T}_q$.

The distance calculation unit 241 generates a comparison texture $\vec{T}_c$ as the texture which is the closest to the input texture $\vec{T}_q$ in the texture space $\Psi_j$, and outputs the evaluation value D of the distance between the comparison texture $\vec{T}_c$ and the input texture $\vec{T}_q$.

The registered texture space $\Psi_j$ is read in, and only the elements that correspond to the pixels (i.e., the region A of FIG. 17) corresponding to the input image at the time of generating the input texture $\vec{T}_q$ are extracted excepting the unseen region (i.e., the region B of FIG. 17) in the input image among individual basic vectors $\vec{B}_i$, thereby to generate a vector $\vec{C}_i$ in which those elements are arranged.

The distance D between the texture space $\Psi_j$ and the input texture $\vec{T}_q$ can be calculated as the minimum of the errors, in which the input texture $\vec{T}_q$ is expressed by a linear sum of $\{\vec{C}_i\}$, as expressed by equation (7), by the least square method:

$$D = \min_{a_i}(\vec{T}_q - \sigma_i(a_i\vec{c}_i)). \tag{7}$$

Figure 18:
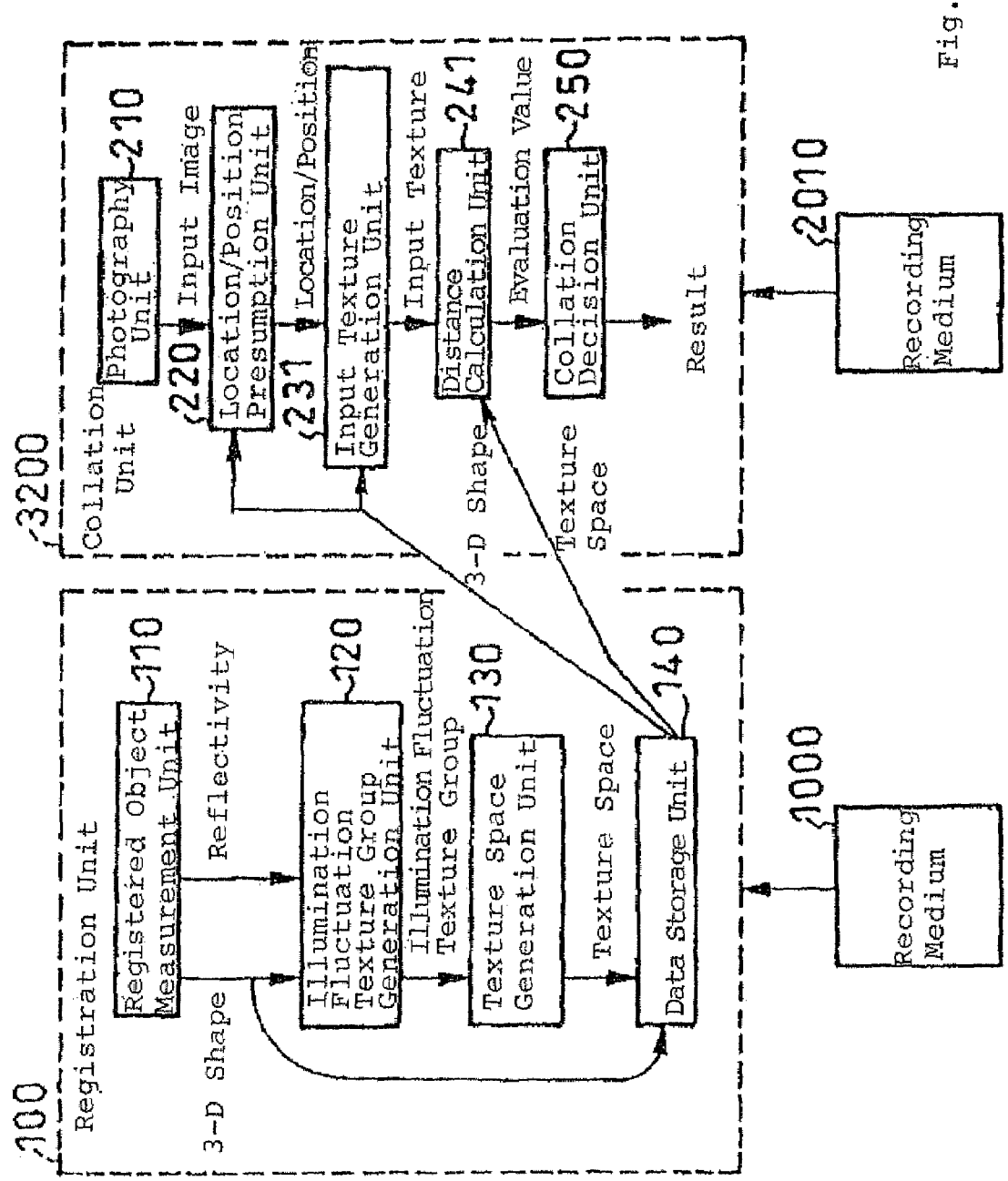
FIG. 18 is a block diagram showing another example of the construction of the objection collation apparatus of the third embodiment.

The object collation apparatus thus far described can also be realized with the software by using the general-purpose computer system such as the personal computer. FIG. 18 is a block diagram showing the construction of the object collation apparatus, as is realized by using the computer system. This object collation apparatus is different from that shown in FIG. 17 in that the registration unit 100 is provided with the recording medium 1000 recorded with the registration programs, and in that the collation unit 3200 is provided with the recording medium 2010 recorded with the collation programs. These recording media 1000 and 2010 may be the magnetic disk, the semiconductor memory or other recording media.

The registration programs are read from the recording medium 1000 in the computer constructing the registration unit 100, and controls the actions of the computer as the registered object measurement unit 110, the illumination fluctuation texture group generation unit 120, the texture space generation unit 130 and the data storage unit 140. The same actions of the registration unit 100 as the aforementioned ones are realized by the controls of the registration programs.

The collation programs are read from the recording medium 2010 in the computer constructing the collation unit 3200, and controls the actions of the computer as the collation unit 3200 including the photography unit 210, the location/position presumption unit 220, the input texture generation unit 231, the distance calculation unit 241 and the collation decision unit 250. The same actions of the collation unit 3200 as the aforementioned ones are realized by the controls of the collation programs.

Fourth Embodiment

The object collation method of the fourth embodiment is different from the object collation methods of the first to third embodiments in that, in place of the measurement of the three-dimensional shapes of a plurality of the registered objects in the registration procedure, the three-dimensional shapes of one or a few of registered objects are measured to output an average shape of those three-dimensional shapes of the registered objects. In this embodiment, the shapes of all the objects to be collated are not measured. In place of this, the measurements of the reflectivities are performed by measuring all the objects to be collated, or the image information is photographed under one or more illumination conditions. In the measurements of the reflectivities or the processing at or after the photography of the image informations, only the aforementioned average shape is used as the three-dimensional shapes. In this embodiment of the case of the registered objects having shapes resembling one another, the location/position presumption step and the illumination correction step can be executed by using not the measurements of the three-dimensional shapes of all the registered objects but the representative three-dimensional shape data.

Figure 19B:
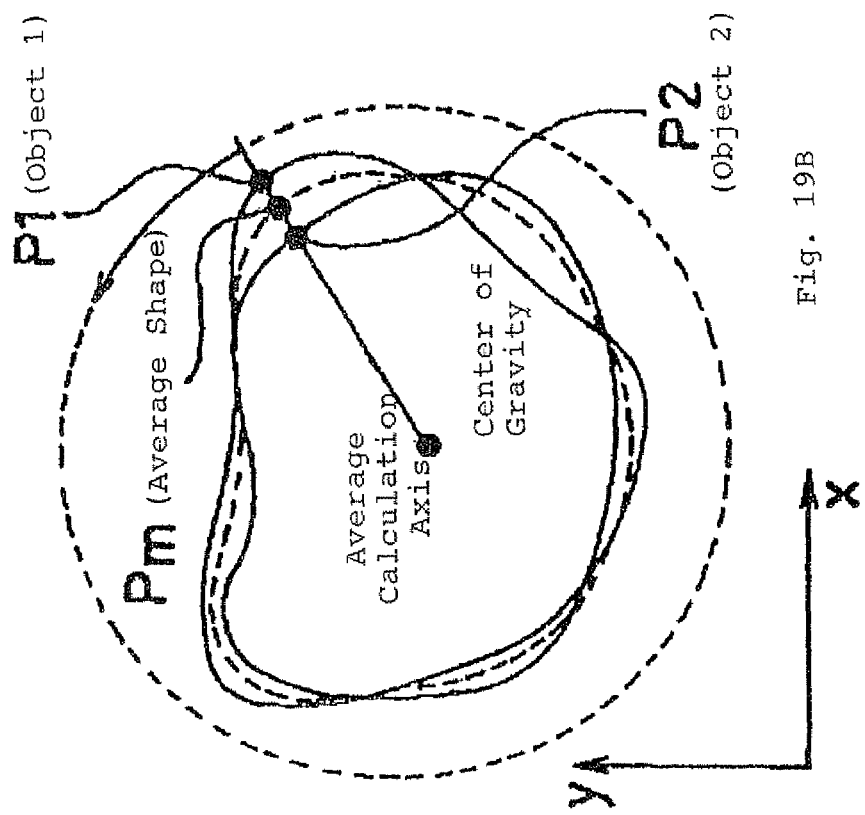
FIGS. 19A and 19B are diagrams for explaining a method for generating an average shape.
Figure 19A:
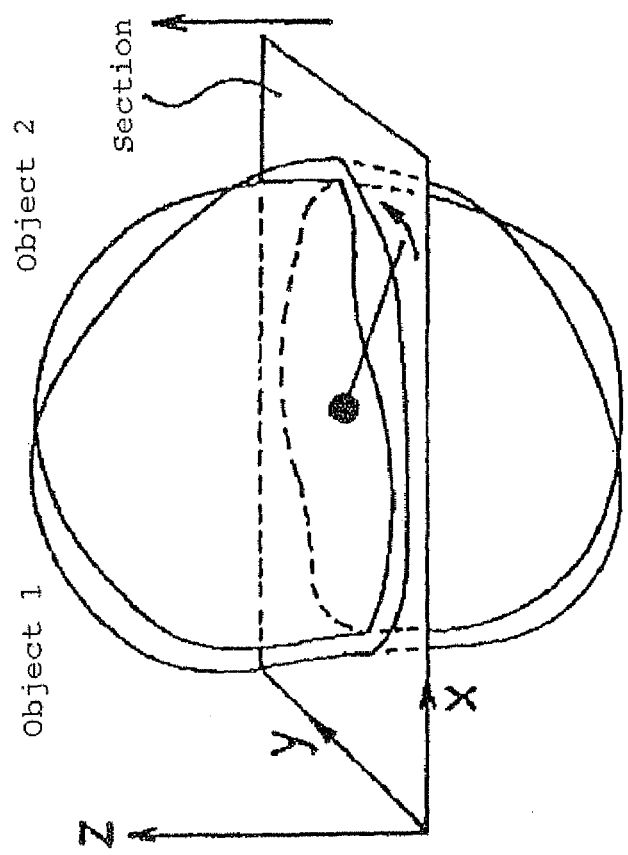

One method to be utilized for generating the average shape is exemplified by the following method. Here will be described an example for determining the average shape of two objects. At first, there are measured the three-dimensional shapes of Object 1 and Object 2. As illustrated in FIG. 19A, the three-dimensional shapes of the two objects are moved in parallel to align their centers of gravity, and a section normal to a z-axis is considered so that the average shape is calculated on the individual sections by moving the sections at a suitable interval in the z-axis direction. As illustrated in FIG. 19B, an average calculation axis is then imagined to be a straight line extending in the section from the center gravity to the outside of the object, and the shapes of Object 1 and Object 2 intersect at points P1 and P2. The three-dimensional coordinates of a point Pm of the average shape are located at $$\left(\frac{x_1+x_2}{2}, \frac{y_1+y_2}{2}, \frac{z_1+z_2}{2}\right)$$

by averaging the three-dimensional coordinates $(x_1, y_1, z_1)$ and $(x_2, y_2, z_2)$ of the points P1 and P2 on the two object surfaces. By repeating these operations while rotating the average calculation axis at a suitable interval on the center of gravity, it is possible to generate the average shape of Object 1 and Object 2. The three-dimensional shape measurement outputs that average shape.

This method could be applied if the number of objects to be collated is three or more. There could be utilized other various methods for determining the average shape.

In the collation procedure, the average shape is read out at the data storage step and is used for the three-dimensional shape of each registered object.

Figure 20:
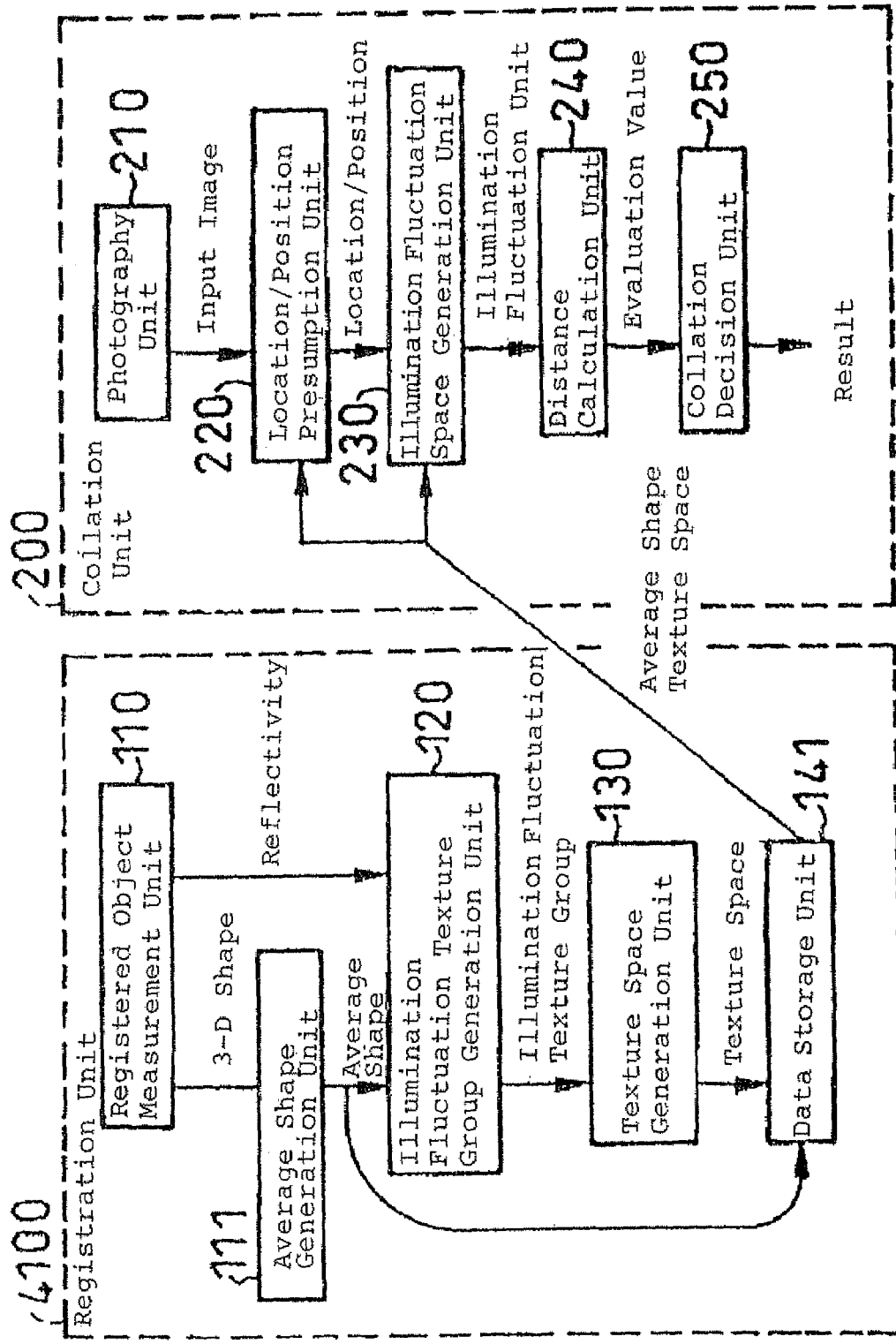
FIG. 20 is a block diagram showing the construction of an object collation apparatus according to a fourth embodiment of the invention.
Figure 21:
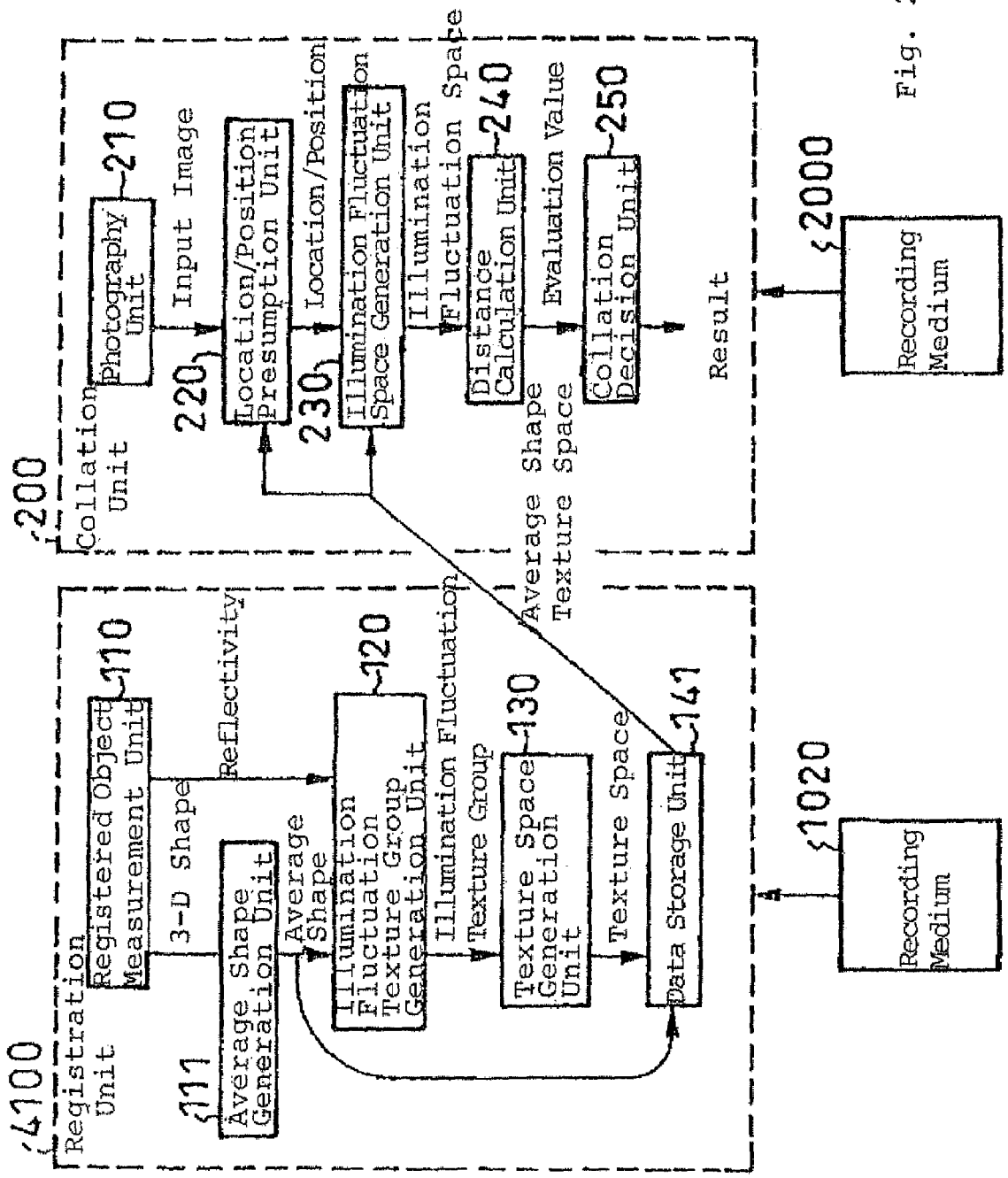
FIG. 21 is a block diagram showing another example of the objection collation apparatus of the fourth embodiment.

Here will be described an object collation apparatus for executing such object collation method. FIG. 20 is a block diagram showing the construction of the object collation apparatus in this embodiment. This object collation apparatus is constructed to comprise a registration unit 4100 and the collation unit 200. The registration unit 4100 includes the registered object measurement unit 110, an average shape generation unit 111, the illumination fluctuation texture group generation unit 120, the texture space generation unit 130 and a data storage unit 141. The collation unit 200 includes the photography unit 210, the location/position presumption unit 220, the illumination fluctuation space generation unit 230, the distance calculation unit 240 and the collation decision unit 250. This object collation apparatus is different from that of the first embodiment in that not the three-dimensional shapes of all the registered objects but the three-dimensional shapes of one or a few of registered objects are measured at the registered object measurement unit 110 when the registered objects are to be registered in the registration unit 4100 so that the average shape of the three-dimensional shapes of those registered objects is outputted at the average shape generation unit 111, in that the shapes of all the objects to be collated are not measured, and in that the average three-dimensional shape is utilized at the collation unit 200.

Here will be described an example in which the two registered objects of Object 1 and Object 2 are registered.

At first, the registration unit 4100 is registered with the average shape and the individual texture spaces of the two registered objects of Object 1 and Object 2 as the registered data to be used for collating the objects.

The registered object measurement unit 110 measures the three-dimensional shapes of Object 1 and Object 2 by using the three-dimensional shape measurement device described in Reference 8.

As illustrated in FIG. 19A, the average shape generation unit 111 calculates the average shape on the individual sections by moving the three-dimensional shapes of Object 1 and Object 2 in parallel to align their centers of gravity, and by setting a section normal to the z-axis at a suitable interval. Next, as illustrated in FIG. 19B, the average calculation axis is imagined as the straight line extending in the section from the center gravity to the outside of the object, and the shapes of Object 1 and Object 2 intersect at points P1 and P2. The three-dimensional coordinates of a point Pm of the average shape are located at $$\left(\frac{x_1 + x_2}{2}, \frac{y_1 + y_2}{2}, \frac{z_1 + z_2}{2}\right)$$

by averaging the three-dimensional coordinates $(x_1, y_1, z_1)$ and $(x_2, y_2, z_2)$ of the points P1 and P2 on the two object surfaces. By repeating these operations while rotating the average calculation axis at a suitable interval on the center of gravity, it is possible to generate the average shape of Object 1 and Object 2. The average shape generating unit 111 outputs that average shape.

The operations at or after this are all similar to those of the first embodiment, excepting that the average shape is used in place of the three-dimensional shapes of the individual objects, and that the average shape and the texture spaces of the individual objects are stored in the data storage unit 141.

The operations at the collation unit 200 are all similar to those of the first embodiment, excepting that the three-dimensional shapes, as read out as the shapes of Objects 1 and Object 2 from the data storage unit 141, are only the average shape.

The object collation apparatus of the fourth embodiment has been described on the example in which the average shape of two registered objects is stored when they are to be registered. However, this is just one example, and similar operations can be performed for the case of three or more registered objects or for determining the average shape of an arbitrary number of registered objects.

Figure 25:
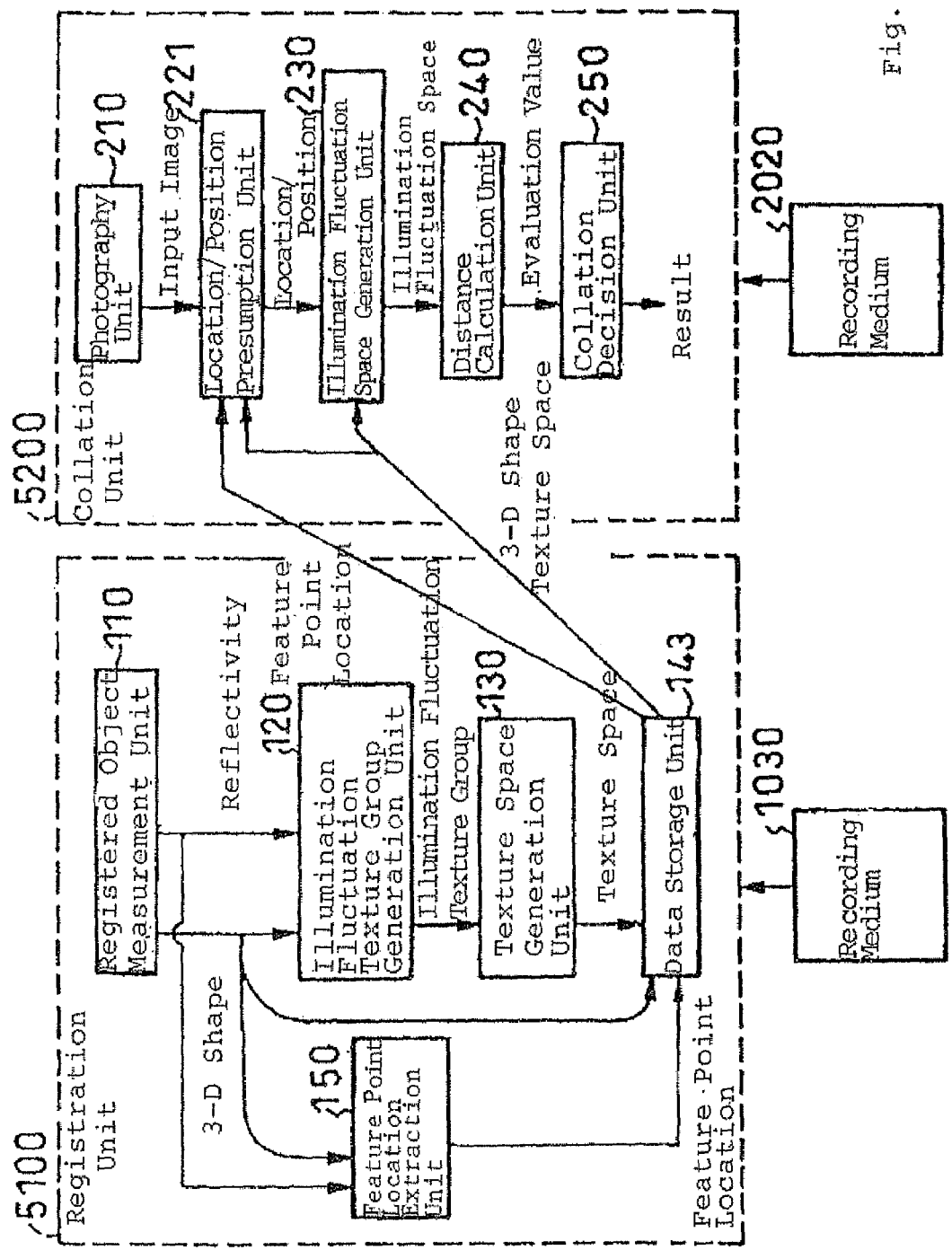
FIG. 25 is a block diagram showing another example of the object collation apparatus of the fifth embodiment.

The object collation apparatus thus far described can also be realized with the software by using the general-purpose computer system such as the personal computer. FIG. 25 is a block diagram showing the construction of the object collation apparatus, as is realized by using the computer system. This object collation apparatus is different from that shown in FIG. 20 in that the registration unit 4100 is provided with the recording medium 1020 recorded with the registration programs, and in that the collation unit 200 is provided with the recording medium 2000 recorded with the collation programs. These recording media 1020 and 2000 may be the magnetic disk, the semiconductor memory or other recording media.

The registration programs are read from the recording medium 1020 in the computer constructing the registration unit 4100, and controls the actions of the computer as the registered object measurement unit 110, the average shape generation unit 111, the illumination fluctuation texture group generation unit 120, the texture space generation unit 130 and the data storage unit 141. The same actions of the registration unit 4100 as the aforementioned ones are realized by the controls of the registration programs.

The collation programs are read from the recording medium 2000 in the computer constructing the collation unit 200, and controls the actions of the computer as the collation unit 200 including the photography unit 210, the location/position presumption unit 220, the illumination fluctuation space generation unit 230, the distance calculation unit 240 and the collation decision unit 250. The same actions of the collation unit 200 as the aforementioned ones are realized by the controls of the collation programs.

Fifth Embodiment

The object collation method of this embodiment is characterized in that the location information of a feature portion of the registered object is added in the registration procedure to the registered data and is registered. If the location of the feature point of the registered object is extracted and stored as the registered data so that the three-dimensional coordinate of the feature point of the input image can be known from the registered data, the location and position of the target object in the input image and the parameters of the photography device can be automatically determined by using the location on the image and the three-dimensional coordinate of the feature point.

Where the location on the image and the three-dimensional coordinate are known on a plurality of points, the camera calibration method can be utilized as the method for automatically determining the location and position of the target object in the input image and the parameters of the photography device. There are many methods, one of which is described in Reference 11.

Figure 22:
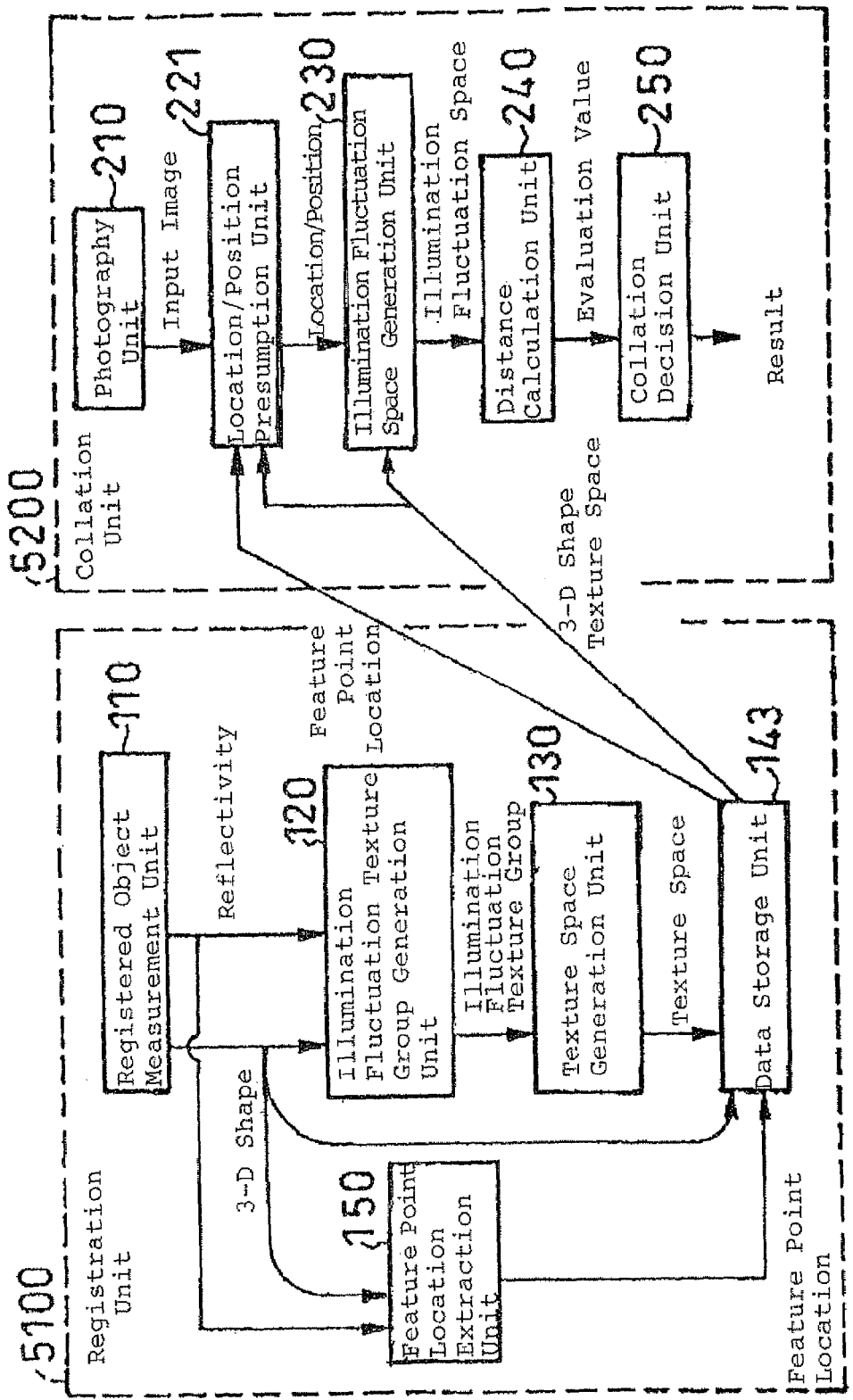
FIG. 22 is a block diagram showing the construction of an object collation apparatus according to a fifth embodiment of the invention.

Here will be described the object collation apparatus for executing such object collation method. FIG. 22 is a block diagram showing the construction of the object collation apparatus in this embodiment. This object collation apparatus is constructed to comprise a registration unit 5100 and a collation unit 5200. The registration unit 5100 includes the registered object measurement unit 110, the illumination fluctuation texture group generation unit 120, the texture space generation unit 130, a data storage unit 143 and a feature point location extraction unit 150. The collation unit 5200 includes the photography unit 210, a location/position presumption unit 221, the illumination fluctuation space generation unit 230, the distance calculation unit 240 and the collation decision unit 250. This object collation apparatus is different from that of the first embodiment, in that there is added to the registration unit 5100 the feature point location extraction unit 150 for extracting the location of the feature point having a luminance value changed highly on the image of the registered object and for outputting the extracted point as the feature point location, in that the feature point location is stored in the data storage unit 143, and in that the feature point location is read at the location/position presumption unit 221 of the collation unit 5200 from the data storage unit 143 thereby to presume the location and position of the target object automatically.

Here will be described the object collation using the object collation apparatus by exemplifying the object to be collated, by a human face.

At first, in the registration unit 5100, the three-dimensional shape and the reflectivity of the registered object are measured, and the three-dimensional coordinate of the feature point of the registered object is determined from the three-dimensional shape and the reflectivity, so that the three-dimensional shape, the texture space and the feature point location are registered as the registered data to be used for collating the object.

The registered object measurement unit 110 measures the three-dimensional shape and the reflectivity of the registered object by using the three-dimensional shape measurement device. Here, the three-dimensional shape measurement device is exemplified by the aforementioned one described in Reference 8, but other various devices could be utilized.

Figure 23:
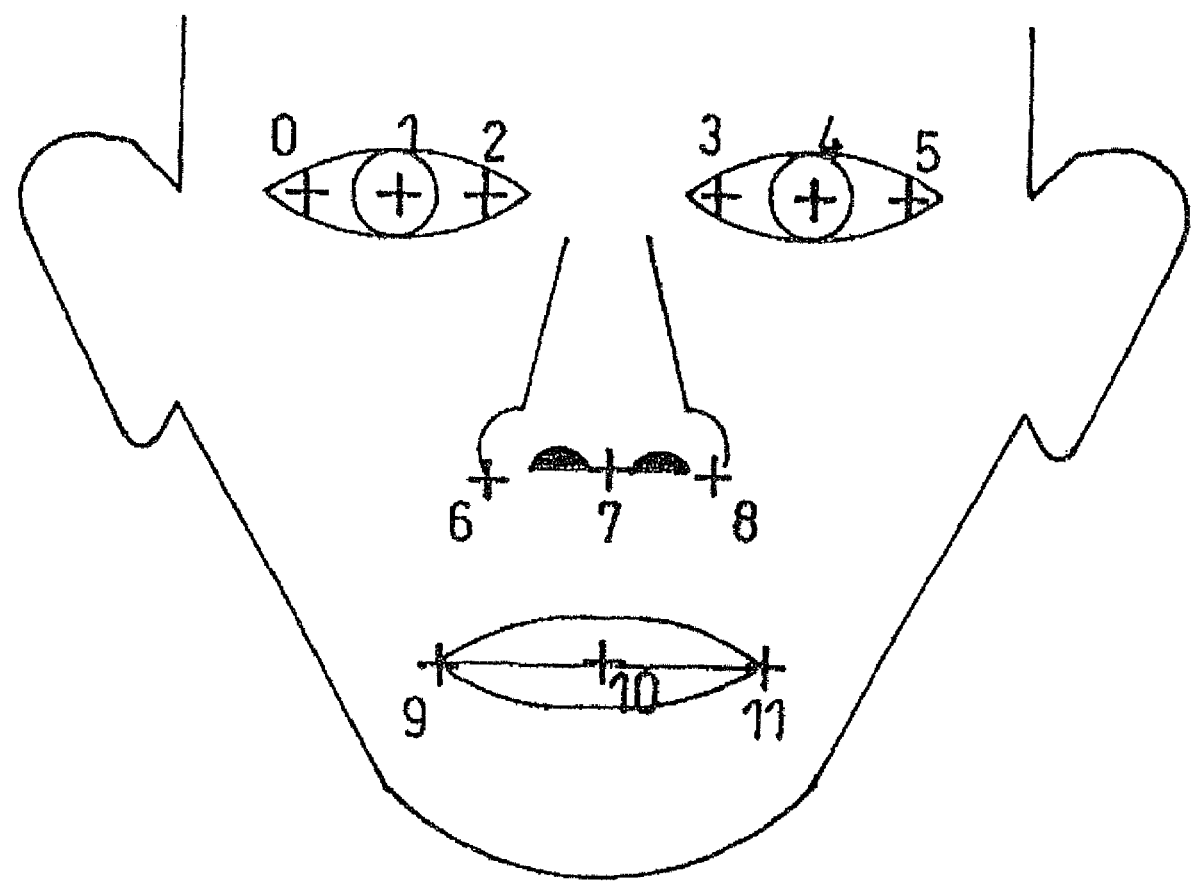
FIG. 23 is a diagram showing one example of portions of an object to be collated, as used as the feature points of the object.

The feature point location extraction unit 150 detects the location of the feature region or the point (i.e., the feature point) such as the portion where the luminance value highly changes on the image of the registered object, and outputs its three-dimensional coordinate as the feature point location. Where a human face is the object to be collated, for example, there is detected the portion such as the tails of the eyes or the mouth ends where the reflectivity highly changes, or the portion such as the head of the nose where the three-dimensional shape highly changes. This detection can be made either by manually or by a variety of automatic methods, as described in Reference 1 or Reference 3. Here, twelve points (point 0 to point 11) at locations, as shown in FIG. 23, are used as the feature points. It is quite natural that the definition of these feature points could be changed in various manners depending on the objects to be collated. The feature point locations $\vec{A}_i$ or the three-dimensional coordinates of the feature points will be expressed by $\vec{A}_i = (x_i, y_i, z_i)$ (i=0,1,2, ... ,11).

The data storage unit 143 stores and holds the three-dimensional shape, the texture space and the feature point location of each registered object, and reads out them at a proper time for the operations of the collation unit 5200.

The registered object thus processed at the registration unit 5100 is subjected at the collation unit 5200 to the object collation using the input image of the target object, as will be described in the following.

At the photography unit 210, the input image of the target object is taken by using the photography device such as the camera or the video camera.

Figure 24:
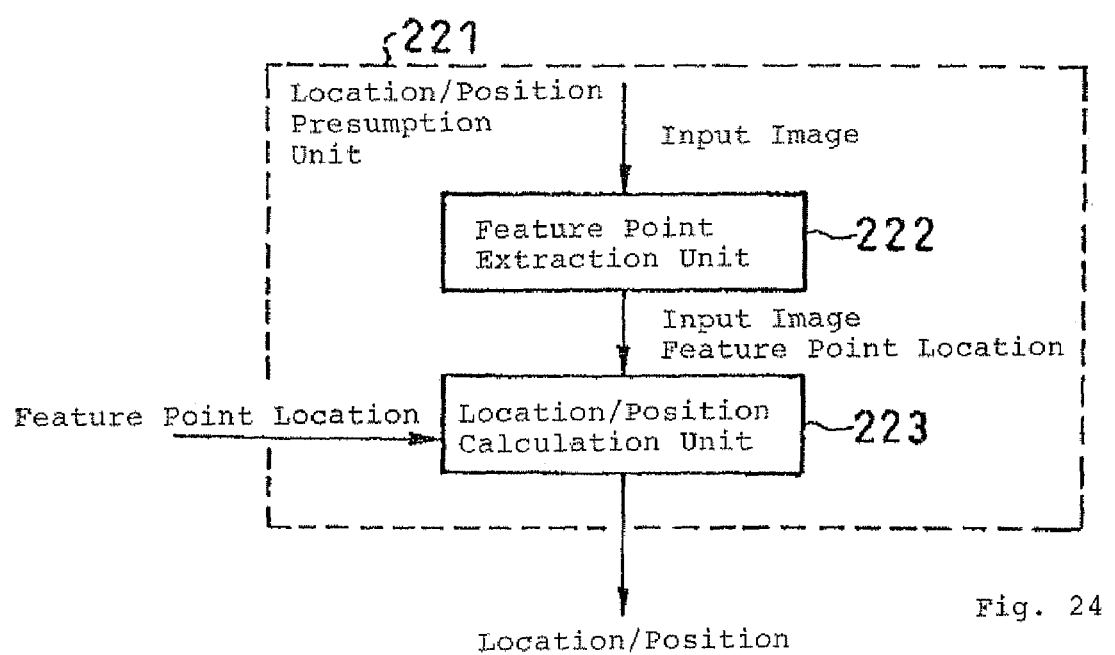
FIG. 24 is a block diagram showing a more detailed construction of a location/position estimation unit.

The location/position presumption unit 221 presumes the location and position of the target object and the parameters of the photography device, i.e., the photographic conditions at the time when the input image has been taken. As shown in FIG. 24, the location/position presumption unit 221 is constructed to include a feature point extraction unit 222 and a location/position calculation unit 223.

The feature point extraction unit 222 extracts the location of the same feature point as the feature point group $\vec{A}_i$, as extracted by the feature point location extraction unit 150 of the registration unit 5100, from the input image, and outputs the location $\vec{B}_i = (u_i, v_i)$ (i=0,1,2, ... ,11) on the input image as the input image feature point location. This can be made such that the user manually inputs while observing the input image displayed on the screen of the processing device, and it is possible to utilize various methods similar to those used in the feature point location extraction unit 150, as has been described in Reference 3 and Reference 4. Where an object having a polygonal shape is to be collated, for example, the apexes can be utilized as the feature points, and the edges can be extracted from the image to detect the apexes of the polygon as their intersections. Where the object surface has a feature pattern, the location of the pattern can also be utilized.

The location/position calculation unit 223 calculates the location and position of the target object in the input image and the parameters of the photography device by utilizing the input image feature point location and the feature point location read out from the data storage unit 143, and outputs them as the location and position. For this calculation, there can be utilized various methods such as the method described in Reference 4. In an example, the parameters of the location and position are exemplified by the translational distance ($T_x$, $T_y$, $T_z$) of the target object, the rotational angles ($R_x$, $R_y$, $R_z$) on the x-, y- and z-axes and focal distance f of the camera, and the following method is performed by using a pin-hole camera as the camera model. Here, the parameters including the focal distance f of the photography device will be called the location and position. The relations between the feature point location $\vec{A}_i$ and the input image feature point location $\vec{B}_i$ are expressed by equation (8):

$$\begin{bmatrix} u_i \\ v_i \end{bmatrix} = \frac{f}{c}\begin{bmatrix} a \\ b \end{bmatrix}. \tag{8}$$

Here, a, b and c take values, as expressed by equation (9):

$$\begin{bmatrix} a \\ b \\ c \end{bmatrix} = R\begin{bmatrix} x_i \\ y_i \\ z_i \end{bmatrix} + \begin{bmatrix} T_x \\ T_y \\ T_z \end{bmatrix}, \tag{9}$$

wherein R designates a matrix indicating the rotation, as expressed by equation (10):

$$R = \begin{bmatrix} \cos R_y \cos R_z & -\cos R_x \sin R_z + \sin R_x \sin R_y \cos R_z & \sin R_x \sin R_z + \cos R_x \sin R_y \cos R_z \\ \cos R_y \sin R_z & \cos R_x \cos R_z + \sin R_x \sin R_y \sin R_z & -\sin R_x \cos R_z + \cos R_x \sin R_y \sin R_z \\ -\sin R_y & \sin R_x \cos R_y & \cos R_x \cos R_y \end{bmatrix}. \tag{10}$$

The values $R_x$, $R_y$, $R_z$, $T_x$, $T_y$, $T_z$ and f are so determined by the optimizing calculations that the total of the errors between the values calculated by equation (8) for the twelve feature points and the values of the input image feature point location may be minimized. Various method can be utilized for the optimizing calculations. The values $R_x$, $R_y$, $R_z$, $T_x$, $T_y$, $T_z$ and f are outputted as the location/position parameters.

The definitions and the calculation methods of the location/position parameters and the camera models thus far described are just examples, and other various methods could be utilized.

The operations at and after the illumination fluctuation space generation unit 230 are identical to those of the first embodiment.

The object collation apparatus thus far described can also be realized by the software using the general-purpose computer such as the personal computer. FIG. 25 is a block diagram showing the construction of the object collation apparatus which is realized by using the computer system. This object collation apparatus is different from that shown in FIG. 22 in that the registration unit 5100 is provided with a recording medium 1030 recorded with the registration programs, and in that the collation unit 5200 is provided with a recording medium 2020 recorded with the collation programs. These recording media 1030 and 2020 may be the magnetic disk, the semiconductor memory or other recording media.

The registration programs are read from the recording medium 1030 in the computer constructing the registration unit 5100, and controls the actions of the computer as the registered object measurement unit 110, the illumination fluctuation texture group generation unit 120, the texture space generation unit 130, the data storage unit 143 and the feature point location extraction unit 150. The same actions of the registration unit 5100 as the aforementioned ones are realized by the controls of the registration programs.

The collation programs are read from the recording medium 2020 in the computer constructing the collation unit 5200, and controls the actions of the computer as the collation unit 5200 including the photography unit 210, the location/position presumption unit 221, the illumination fluctuation space generation unit 230, the distance calculation unit 240 and the collation decision unit 250. The same actions of the collation unit 5200 as the aforementioned ones are realized by the controls of the collation programs.

Sixth Embodiment

The object collation method of the sixth embodiment is different from those according to the first to fourth embodiments of the invention in that the three-dimensional shape of the registered object is not measured but is inputted separately from the drawings or the like. Where the three-dimensional shape of the registered object is present as the drawings or data for its design, according to this embodiment, the registration procedure can be executed not by measuring the registered object but by inputting the data from the drawings.

Where the object to be collated has design drawings such as those of industrial products or where the measurements of a three-dimensional shape such as a building are difficult for the ordinary three-dimensional shape measuring device, or executed by separate surveys, for example, the three-dimensional shape of the registered object can be inputted from the drawings or the like.

Here, the reflectivity of the registered object is not measured, but the reflectivity or color information may be inputted separately from the drawings or the like. Where the reflectivity or color information of the object surface is present as the drawings or data such as the design drawings of the object, the registration procedure can be executed not by performing the measurements of the reflectivity or the photography but by inputting the data from the drawings or the like. When the object to be collated is one such as an industrial product, the individual portions of which have paints of known reflectivities on the surface, the reflectivities or the like of the object are inputted from the drawings or the like.

Figure 26:
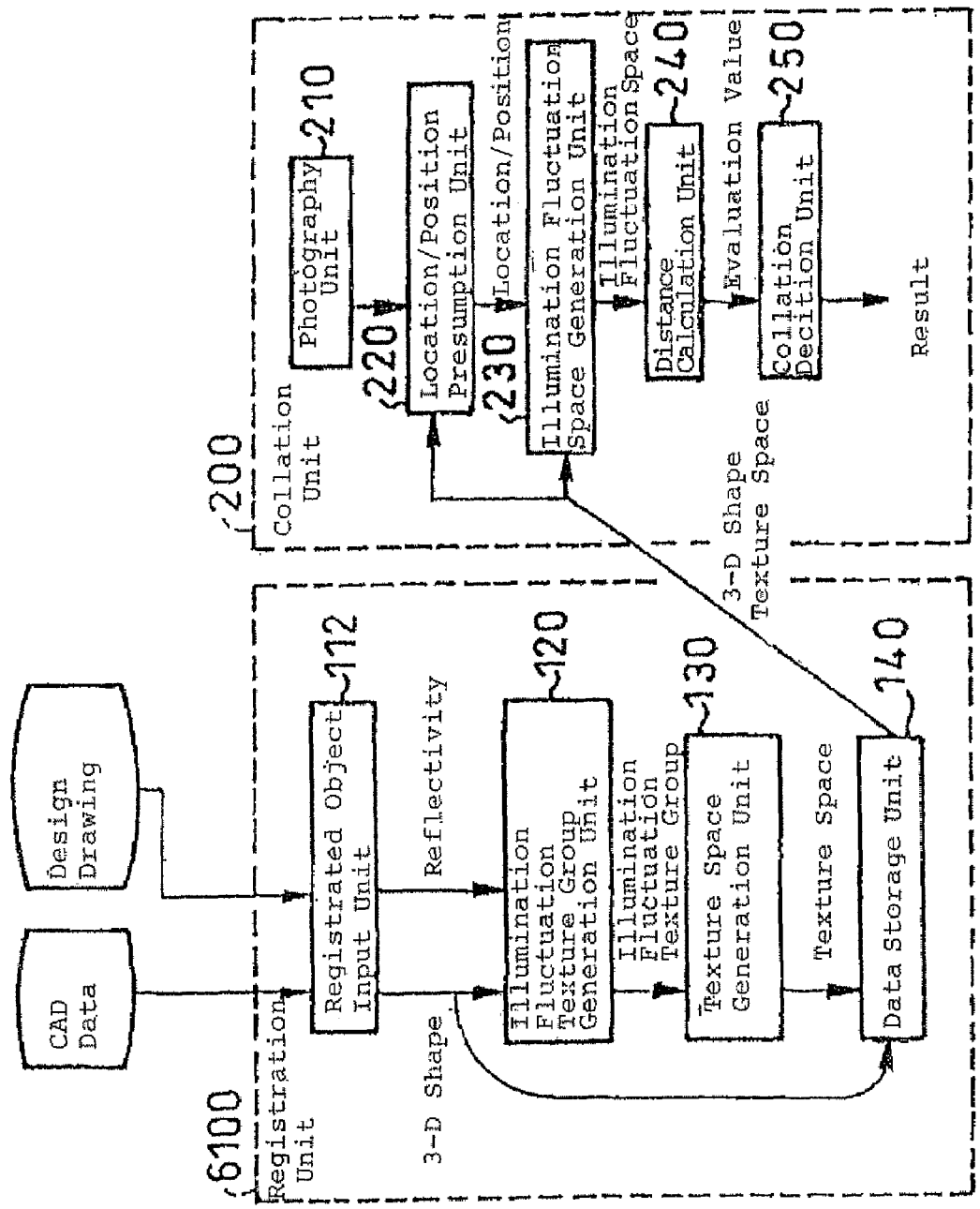
FIG. 26 is a block diagram showing the construction of an object collation apparatus according to a sixth embodiment of the invention.

Here will be described the object collation apparatus for executing such object collation method. FIG. 26 is a block diagram showing the construction of the object collation apparatus of this embodiment. This object collation apparatus is constructed to comprise a registration unit 6100 and the collation unit 200. The registration unit 6100 includes a registered object input unit 112, the illumination fluctuation texture group generation unit 120, the texture space generation unit 130 and the data storage unit 140. The collation unit 200 is similar to that of the first embodiment, and includes the photography unit 210, the location/position presumption unit 220, the illumination fluctuation space generation unit 230, the distance calculation unit 240 and the collation decision unit 250.

Here, it is assumed that the object to be collated is an industrial product, that the design drawings of the shape of the object are stored as CAD (Computer Aided Design) data, and that the painting specifications of the surface are determined by the design drawings. As a result, the object collation apparatus is different from that of the first embodiment in that the registered object input unit 112 reads the three-dimensional shape from the CAD data of the design drawings and the reflectivities from the design drawings.

The registered object input unit 112 converts the CAD data of the design drawings into the data format to be handled by the collation unit 200, and outputs them as the three-dimensional shape. Moreover, the input unit 112 reads the colors of the individual portions of the registered object and the surface finishing method from the design drawings, converts them into the reflectivities and outputs the converted reflectivities.

Figure 27:
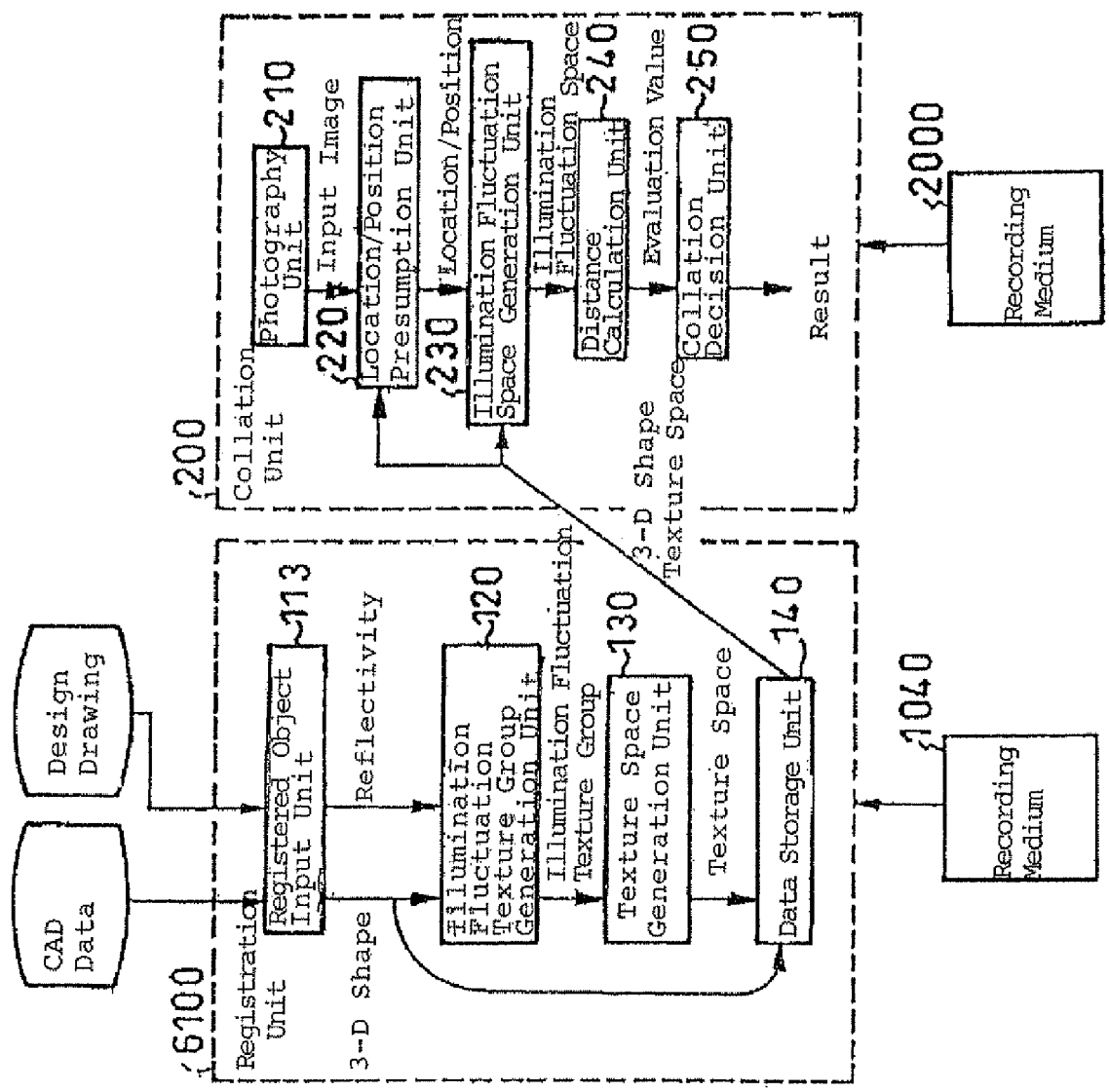
FIG. 27 is a block diagram showing another example of the object collation apparatus of the sixth embodiment.

The object collation apparatus thus far described can also be realized with the software by using the general-purpose computer system such as the personal computer. FIG. 27 is a block diagram showing the construction of the object collation apparatus, as is realized by using the computer system. This object collation apparatus is different from that shown in FIG. 26 in that the registration unit 6100 is provided with the recording medium 1040 recorded with the registration programs, and in that the collation unit 200 is provided with the recording medium 2000 recorded with the collation programs. These recording media 1040 and 2000 may be the magnetic disk, the semiconductor memory or other recording media.

The registration programs are read from the recording medium 1040 in the computer constructing the registration unit 6100, and controls the actions of the computer as a registered object input unit 113, the illumination fluctuation texture group generation unit 120, the texture space generation unit 130 and the data storage unit 140. The same actions of the registration unit 6100 as the aforementioned ones are realized by the controls of the registration programs.

The collation programs are read from the recording medium 2000 in the computer constructing the collation unit 200, and controls the actions of the computer as the collation unit 200 including the photography unit 210, the location/position presumption unit 220, the illumination fluctuation space generation unit 230, the distance calculation unit 240 and the collation decision unit 250. The same actions of the collation unit 200 as the aforementioned ones are realized by the controls of the collation programs.

As has been described hereinbefore, the present invention could be applied to the collation of an arbitrary object but is especially effective for applications to collate the kind and type of an automobile and to collate a human face.

While preferred embodiments of the present invention have been described using specific terms, such description is for illustrative purposes only, and it is to be understood that changes and variations may be made without departing from the spirit or scope of the following claims.

What is claimed is:

1. An object collation method comprising:
   a registration procedure registering registered data of a registered object in a database; and
   a collation procedure collating on an object collation apparatus an input image of a target object with said registered data,
   said registration procedure comprising the steps of:
   inputting a three-dimensional shape of the registered object and reflectivity of a surface of the registered object;
   acquiring a texture group indicating luminance and color information of each location of the surface of the registered object under various illumination conditions by using said three-dimensional shape and said reflectivity;

generating a texture space, which is an image space, defined by said texture group; and storing said three-dimensional shape and said texture space, and said collation procedure comprising the steps of:

taking a two-dimensional image of the target object as an input image;

presuming location and position of the target object in said input image;

converting the input image into an input texture by using said three-dimensional shape and said presumed location and position;

calculating distance between said texture space and said texture obtained at said converting step; and collating the target object and the registered object based on said distance.

2. A method according to claim 1, wherein said generating step comprises the step of analyzing said texture group statistically to determine a basic texture group of basic vectors of a space covering most of fluctuation factors appearing on the texture in accordance with the illumination conditions, wherein said storing step comprises the step of storing said basic texture group as the texture group, wherein said calculating step comprises the steps of determining a correlation between said basic texture group and said input image; generating a comparison texture which is closest to said input texture from the basic texture group based on said correlation; and outputting similarity between said comparison texture and said input texture as the distance.

3. A method according to claim 1, wherein location information of a feature portion of the registered object is added to said registered data and is stored.

4. An object collation method comprising:

a registration procedure registering registered data of a registered object in a database; and a collation procedure collating on an object collation apparatus an input image of a target object with said registered data;

said registration procedure comprising the steps of:

inputting a three-dimensional shape of the registered object and reflectivity of a surface of the registered object;

acquiring a texture group indicating luminance and color information of each location of the surface of the registered object under various illumination conditions by using said thee-dimensional shape and said reflectivity;

generating a texture space, which is an image space, defined by said texture group; and storing said three-dimensional shape and said texture space; and said collation procedure comprising the steps of:

taking a two-dimensional image of the target object as an input image;

presuming location and position of the target object in said input image;

generating an illumination fluctuation space, which is defined by an image group under the various illumination conditions, at same location and position as said presumed location and position, by using said three-dimensional shape and said texture space, said fluctuation space being an image space;

calculating distance between said input image and said illumination fluctuation space; and collating the target object and the registered object based on said distance, wherein location information of a feature portion of the registered object is added to said registered data and is stored.

* * * * *